US012146365B2

(12) United States Patent
Allmandinger et al.

(10) Patent No.: US 12,146,365 B2
(45) Date of Patent: Nov. 19, 2024

(54) DOOR-READY MOLDING

(71) Applicant: Larson Manufacturing Company of South Dakota, LLC, Brookings, SD (US)

(72) Inventors: Adam A. Allmandinger, Grabill, IN (US); Alan M. Dixon, Arlington, SD (US); Michael W. Kondratuk, Brookings, SD (US); Jammey A. Rawden, Volga, SD (US)

(73) Assignee: LARSON MANUFACTURING COMPANY OF SOUTH DAKOTA, LLC, Brookings, SD (US)

( * ) Notice: Subject to any disclaimer, the term of this patent is extended or adjusted under 35 U.S.C. 154(b) by 14 days.

(21) Appl. No.: 17/525,277

(22) Filed: Nov. 12, 2021

(65) Prior Publication Data

US 2022/0145693 A1 May 12, 2022

Related U.S. Application Data

(63) Continuation-in-part of application No. 17/318,538, filed on May 12, 2021, now Pat. No. 11,891,851.

(60) Provisional application No. 63/025,328, filed on May 15, 2020.

(51) Int. Cl.
*E06B 1/56* (2006.01)
*E06B 1/04* (2006.01)
*E06B 1/60* (2006.01)
*E06B 5/00* (2006.01)

(52) U.S. Cl.
CPC ................ *E06B 1/60* (2013.01); *E06B 5/003* (2013.01)

(58) Field of Classification Search
CPC ......... E06B 1/60; E06B 5/003; E05D 5/0215; E05D 5/023; E05D 5/0238; E05D 5/06; E05D 5/065; E05D 11/02
USPC ........................................................ 52/204.1
See application file for complete search history.

(56) References Cited

U.S. PATENT DOCUMENTS 2,725,960 A 12/1955 Milone
2,904,824 A * 9/1959 Kuehl ..................... E05F 1/063 16/318
3,024,501 A 3/1962 Mcphail
3,164,228 A 1/1965 Segre
3,177,924 A 4/1965 Mcphail
3,274,733 A 9/1966 Bailey
3,748,688 A * 7/1973 Berkowitz .............. E05F 1/063 16/312
4,297,812 A * 11/1981 McPhail ................. E06B 5/003 49/386
4,302,907 A 12/1981 Canals et al.
4,365,386 A 12/1982 Lowery
4,389,817 A * 6/1983 Olberding ............. E05B 47/026 49/67

(Continued)

*Primary Examiner* — James J Buckle, Jr.
(74) *Attorney, Agent, or Firm* — Calfee, Halter & Griswold LLP

(57) ABSTRACT

A door system including a primary door molding attachable to a primary door frame, the primary door molding including a first vertical member and a first hinge member extending from the first vertical member. One of a horizontal member from which the first vertical member downwardly extends and the first vertical member includes a first rotatably engageable element, and the first hinge member includes a second rotatably engageable element vertically spaced from the first rotatably engageable element.

16 Claims, 26 Drawing Sheets

(56) References Cited

U.S. PATENT DOCUMENTS

| | | | | |
|---|---|---|---|---|
| 4,531,337 | A | 7/1985 | Holdiman | |
| 5,012,616 | A * | 5/1991 | Martin | E06B 5/003 49/501 |
| 5,483,771 | A * | 1/1996 | Herbst | E05D 5/04 49/504 |
| D401,134 | S * | 11/1998 | Finkelstein | D8/329 |
| 6,185,881 | B1 | 2/2001 | Olberding et al. | |
| 6,651,390 | B2 | 11/2003 | Camperelli | |
| 6,941,997 | B2 | 9/2005 | Butler | |
| 7,866,118 | B1 * | 1/2011 | Hamblin | E06B 5/003 160/369 |
| 7,945,996 | B2 * | 5/2011 | Gunderson | E05F 1/063 16/303 |
| 8,020,253 | B1 * | 9/2011 | Finkelstein | E05D 7/1011 16/250 |
| 8,505,166 | B2 * | 8/2013 | Mitchell | E05F 1/066 16/315 |
| 8,850,744 | B2 | 10/2014 | Bauman et al. | |
| 8,887,457 | B1 | 11/2014 | Knight | |
| 9,316,041 | B2 | 4/2016 | Olson et al. | |
| 9,677,310 | B1 * | 6/2017 | Russo | E05D 7/0027 |
| 9,739,523 | B1 * | 8/2017 | Augsburger | E05D 3/02 |
| 10,774,570 | B1 | 9/2020 | Dixon et al. | |
| 10,801,241 | B1 | 10/2020 | Dixon et al. | |
| 10,801,242 | B1 | 10/2020 | Dixon et al. | |
| 10,808,438 | B2 | 10/2020 | Takase et al. | |
| 10,995,534 | B1 | 5/2021 | Dixon et al. | |
| 11,008,795 | B1 | 5/2021 | Dixon et al. | |
| 11,035,169 | B1 | 6/2021 | Wermers et al. | |
| 11,655,665 | B2 | 5/2023 | Chavez | |
| 2002/0174612 | A1 | 11/2002 | Camperelli | |
| 2004/0173324 | A1 * | 9/2004 | Butler | E05D 3/04 160/92 |
| 2006/0150524 | A1 * | 7/2006 | Kibbel | E05B 63/14 49/501 |
| 2013/0333847 | A1 * | 12/2013 | Casseri | E06B 9/54 160/90 |
| 2014/0026489 | A1 | 1/2014 | Bauman et al. | |
| 2014/0215759 | A1 * | 8/2014 | Mitchell | E05D 7/0423 16/235 |
| 2014/0215760 | A1 * | 8/2014 | Mitchell | E05F 1/1223 16/254 |
| 2014/0338275 | A1 | 11/2014 | Knight | |
| 2015/0082702 | A1 | 3/2015 | Walter | |
| 2016/0053527 | A1 | 2/2016 | Olson et al. | |
| 2020/0131842 | A1 * | 4/2020 | Thomas | E06B 9/52 |
| 2022/0003035 | A1 | 1/2022 | Dixon et al. | |

* cited by examiner

DOOR-READY MOLDING

CROSS-REFERENCE TO RELATED APPLICATIONS

This application is a continuation-in-part of U.S. patent application Ser. No. 17/318,538, filed May 12, 2021, and titled "DOOR-READY MOLDING" which claims the benefit of U.S. Provisional Patent Application No. 63/025,328, filed May 15, 2020, and titled "DOOR-READY MOLDING" the entire contents of which are incorporated herein by reference in their entireties.

TECHNICAL FIELD

The present disclosure generally relates to secondary doors such as storm doors and primary door systems with molding elements configured for rotatably mounting secondary doors without separate installation of a secondary door frame.

BACKGROUND

Door systems for entrances into residential and commercial buildings are well known in the art. Primary doors provide the main security and protection from exterior elements, while secondary doors such as screen doors, storm doors, and security doors offer additional functionality such as enhanced ventilation, energy efficiency, and security when paired with an existing primary door.

Known secondary door systems comprise a secondary door and a secondary door frame. Such systems are typically installed by attachment of the secondary door frame to the primary door frame or the brick molding surrounding the primary door frame by attachment means such as wood screws. The secondary door is connected to the secondary door frame by hinges on one side and optionally includes a latch on the other side to engage with the secondary door frame when closed.

Despite their widespread use, existing door systems have limitations. Existing secondary door systems often require specialized knowledge or skills to install properly and in correct alignment, which may result in the installation being done poorly or not at all. If the primary door and secondary door are produced by different manufacturers, differences in product designs and color selections may reduce aesthetic appeal. In addition, current commercially available doors may lack the functionality or selection that appeals to a wide variety of consumers and decision-makers.

The present disclosure seeks to address these issues, and may be utilized for residential and commercial door systems.

SUMMARY

In accordance with embodiments provided herein, a door system is described that includes a primary door molding attachable to a primary door frame, the primary door molding comprising a first vertical member and a first hinge member extending from the first vertical member. One of a horizontal member from which the first vertical member downwardly extends and the first vertical member comprises a first rotatably engageable element, and the first hinge member comprises a second rotatably engageable element vertically spaced from the first rotatably engageable element. The first rotatably engageable element may be vertically aligned with the second rotatably engageable element. The horizontal member may comprise the first rotatably engageable element, and/or the first hinge member may extend from a distal end of the first vertical member that is spaced from the horizontal member. The door system may further include a second hinge member extending from the first vertical member and vertically spaced from the first hinge member, wherein the second hinge member comprises the first rotatably engageable element.

The door system may further include a secondary door panel rotatably engageable with the first and second rotatably engageable elements. The secondary door panel may include at least one of a third rotatably engageable element engageable with the first rotatably engageable element and a fourth rotatably engageable element engageable with the second rotatably engageable element. Further, one of the first and third rotatably engageable elements may comprise a first pin-receiving portion while the other of the first and third rotatably engageable elements may comprise a first pin rotatably engageable with the first pin-receiving portion, and one of the second and fourth rotatably engageable elements may comprise a second pin-receiving portion while the other of the second and fourth rotatably engageable elements may comprise a second pin rotatably engageable with the second pin-receiving portion.

At least one of the first pin and the second pin may be retractable and extendable. Further, at least one of the first pin and the second pin may have a tapered end portion. At least one of the first and second rotatably engageable elements my comprise an aperture. At least one of the first and second rotatably engageable elements may comprise a bushing. Further, the bushing of at least one of the first and second rotatably engageable elements may comprise a tapered pin-receiving portion.

The primary door molding may further include a second vertical member extending downwardly from the horizontal member and spaced from the first vertical member. The second vertical member may include a door latch channel configured to receive a door latch bolt.

At least one of the first vertical member and the second vertical member may further include a mounting adapter channel, wherein the door system further comprises at least one mounting adapter that includes an attachment segment attachable to a vertical portion of a primary door frame, an intermediate segment extending at an angle from the first attachment segment, and a holding segment extending from the intermediate segment and positionable in the one of the mounting adapter channels. Both of the first and second vertical members may include a mounting adapter channel, and the door system may further include mounting adapters with holding segments positionable in the mounting adapter channels of the first and second vertical members. The primary door molding may be connectable to the primary door frame by the at least one mounting adapter such that the position of the primary door molding relative to the primary door frame is adjustable.

In an embodiment, a door system is provided that includes a primary door frame comprising a first horizontal frame member comprising a first end and an opposite second end, a first vertical frame member downwardly extending from the first end of the first horizontal frame member, a second vertical frame member downwardly extending from the second end of the first horizontal frame member, and a sill member spaced vertically from the first horizontal frame member and extending between the first and second vertical frame members. The system includes a primary door molding attachable to the primary door frame, the primary door molding comprising a first vertical member attached or attachable to one of the first and second vertical frame members. One of a horizontal member from which the first vertical member downwardly extends and the first vertical member comprises a first rotatably engageable element, and one of a first hinge member extending from the first vertical molding member and the sill member comprises a second rotatably engageable element vertically spaced from the first rotatably engageable element.

The door system further may include a secondary door panel rotatably engageable with the first and second rotatably engageable elements. The secondary door panel may include at least one of a third rotatably engageable element engageable with the first rotatably engageable element and a fourth rotatably engageable element engageable with the second rotatably engageable element. Further, one of the first and third rotatably engageable elements may comprise a first pin-receiving portion and the other of the first and third rotatably engageable elements may comprise a first pin rotatably engageable with the first pin-receiving portion, and one of the second and fourth rotatably engageable elements may comprise a second pin-receiving portion and the other of the second and fourth rotatably engageable elements may comprise a second pin rotatably engageable with the second pin-receiving portion.

In an embodiment, a method is provided for installing a door system in a building opening, wherein the door system comprises a primary door molding attachable to a primary door frame. The primary door molding includes a first vertical member and a first hinge member extending from the first vertical member. One of a horizontal member from which the first vertical member downwardly extends and the first vertical member comprises a first rotatably engageable element, and the first hinge member comprises a second rotatably engageable element vertically spaced from the first rotatably engageable element. The method includes the steps of mounting the primary door frame to the building opening and attaching the primary door molding to the primary door frame prior to or after the step of mounting the primary door frame to the building opening. The door system further may further include a secondary door panel comprising at least one of a third rotatably engageable element engageable with the first rotatably engageable element and a fourth rotatably engageable element engageable with the second rotatably engageable element, wherein the method further comprises a step of rotatably mounting the secondary door panel to the primary door molding by at least one of engaging the third rotatably engageable element with the first rotatably engageable element and engaging the fourth rotatably engageable element with the second rotatably engageable element.

In exemplary embodiments, door systems are described that include a primary door frame comprising a hinge-side jamb, a latch-side jamb, a head, and a sill; and a primary door molding comprising a hinge-side molding, a latch-side molding, and a top molding attached to the primary door frame, wherein the primary door molding is configured for rotatably mounting a secondary door. The door system may additionally comprise a primary door rotatably mounted to the primary door frame.

In exemplary embodiments, the primary door molding includes hinge pin receivers in one or both of the hinge-side molding and the top molding. For example, the primary door molding may comprise a hinge pin receiver on the underside of the top molding at a position near the hinge-side molding, and/or the hinge-side molding may comprise a hinge plate with a hinge pin receiver at a position near or at the bottom of the hinge side molding. Hinge pin receivers may be oriented so as to receive hinge pins in a vertical orientation, for example. In some embodiments, the latch-side molding may comprise a door latch channel positioned to receive a door latch bolt. The door system may additionally comprise a secondary door rotatably mounted to the primary door molding.

In exemplary embodiments, the door system additionally comprises a hinge-side mounting adapter, which may comprise a first attachment segment and a first channel segment, where the hinge-side molding comprises a first mounting adapter channel, where the first attachment segment is attached to the hinge-side jamb, and where the first channel segment is positioned in the first mounting adapter channel. The door system may additionally include a latch-side mounting adapter, which may comprise a second attachment segment and a second channel segment, where the latch-side molding comprises a second mounting adapter channel, where the second attachment segment is attached to the latch-side jamb, and where the second channel segment is positioned in the second mounting adapter channel. The primary door molding may be connected to the primary door frame by one or both of the hinge-side mounting adapter and the latch-side mounting adapter in such a way that the position of the primary door molding relative to the primary door frame is adjustable while the primary door molding cannot be non-destructively removed from the primary door frame.

In exemplary embodiments, the primary door frame and primary door molding comprise an integral construction. The latch-side molding may comprise a door latch channel. The primary door molding may comprise hinge pins in one or both of the hinge-side molding and the top molding, for example, the primary door molding may comprise a hinge pin on the underside of the top molding at a position near the hinge-side molding, or the hinge-side molding may comprise a hinge plate at a position near or at the bottom of the hinge side molding, the hinge plate comprising a hinge pin.

In another aspect, the present disclosure provides methods of installing a primary/secondary door system in a door opening in a commercial or residential building, comprising: a) providing a door system comprising: i) a primary door frame comprising a hinge-side jamb, a latch-side jamb, a head, and a sill; and ii) a primary door molding comprising a hinge-side molding, a latch-side molding, and a top molding attached to the primary door frame, wherein the primary door molding is adapted for rotatably mounting a secondary door; and iii) optionally a primary door rotatably mounted to the primary door frame; b) mounting the primary/secondary door system in a door opening in a commercial or residential building; c) optionally anchoring or attaching the primary door molding to a building surface surrounding the door opening; and d) optionally rotatably mounting a secondary door on the primary door molding.

The preceding summary of the present disclosure is not intended to describe each embodiment of the present invention. The details of one or more embodiments of the invention are also set forth in the description below. Other features, objects, and advantages of the invention will be apparent from the description and from the claims.

In this application, the following terminology applies: "Integral" or "integral construction" refer to a construction that is a single piece, though it may comprise elements that can be separately named, that may be a unitary article, or that may be formed from multiple pieces where multiple pieces are permanently joined (such as by welding, permanent adhesive, permanent fasteners, or methods that cannot be reversed non-destructively) to form a single piece construction. "Unitary" or "unitary article" refer to an article that is a single piece, though it may comprise elements that can be separately named, that is formed from a single piece or aliquot of material without division of that piece or aliquot (such as by extruding, casting, stamping, molding, forging, machining, sculpting, or the like), and that lacks seams or joints between elements.

All scientific and technical terms used herein have meanings commonly used in the art unless otherwise specified.

As used in this specification and the appended claims, the singular forms "a", "an", and "the" encompass embodiments having plural referents, and the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising," and the like.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
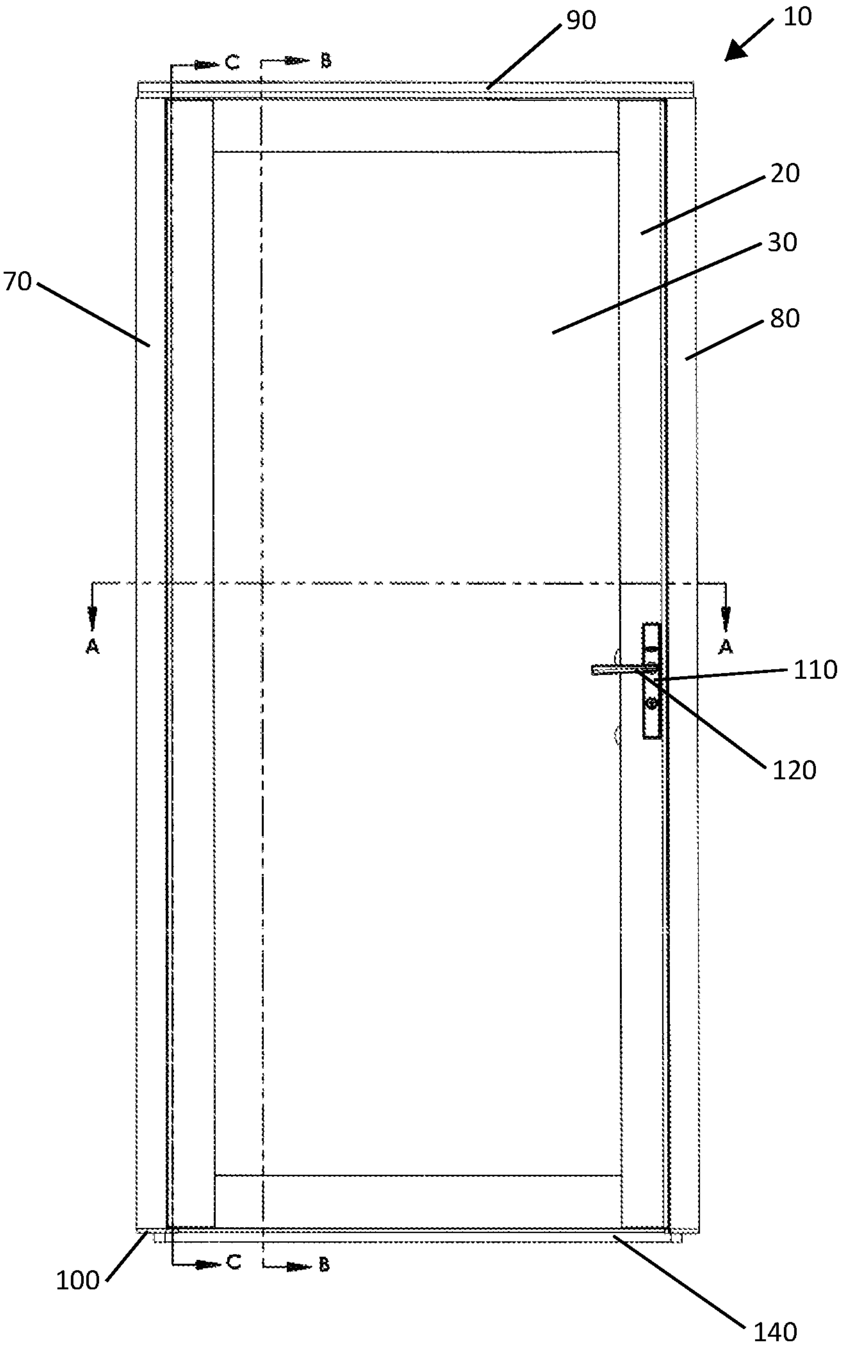
FIG. 1 is a front view of a primary/secondary door system as assembled with primary and secondary doors in a closed position.

The present disclosure describes primary/secondary door systems comprising primary door molding elements configured for mounting a secondary door adjacent to a primary door without requiring separate installation of a secondary door frame. The present primary/secondary door systems comprise a primary door frame (typically including hinge- and latch-side jambs, head, and sill) and the primary door molding (typically including hinge-side and latch-side molding and top molding) attached to each other. Optionally, these components form an integral construction. The primary/secondary door systems can additionally include a primary door rotatably attached by hinges or another attachment system to the primary door frame.

One or more secondary doors may be provided as part of a package or kit with the primary/secondary door system such that the building contractor or consumer may choose one or more coordinated doors in a system so that they can easily install a secondary door at a desired time. In other situations, a contractor provides and installs a "door-ready molding" to the primary door frame and a consumer can later purchase and install a secondary door. In some embodiments, one or more secondary doors may be changed seasonally by the consumer. Because installation is straightforward and generally able to be performed by a single person, it is therefore easy to remove and replace secondary doors, as desired. An embodiment of primary and secondary doors are hinged on the same side, (i.e., right or left), with the primary door opening inward and the secondary door opening outward, although opposite-side hinges are also contemplated.

In embodiments, primary door molding of the primary/secondary door system is configured to perform the functions of external molding (brick molding), including bridging the gap between the primary door frame and the building structure both to help prevent ingress of wind, water, insects or animals and to provide an attractive appearance, positioning the door system properly with respect to the building structure, and providing a surface against which the exterior cladding of the structure (brick, stone, vinyl or cement siding, cedar shingles, and the like) may be installed and sealed. Optionally, the primary door molding may be caulked after installation of the door system to assist in these functions. The primary door molding may be optionally anchored or attached to the building surface after installation of the door system. The primary door molding may have decorative cross-sectional profiles, including combinations of millwork features such as flutes, ogees, quarter-round features, and the like, and may additionally include decorative corner features. The primary door molding sections may have the same or contrasting cross-sectional profiles and may be adapted to accept add-on pieces for additional modification of appearance or style.

In addition, the primary door molding of the primary/secondary door systems of the present disclosure are configured to receive a secondary door, such that the installation of a secondary door frame in order to support a secondary door is unnecessary. The primary door molding can include multiple frame components, such as a hinge-side molding and/or top molding configured for mounting secondary door hinges or equipped with rotatably engageable elements that form a part of a secondary door hinge. In some embodiments, the hinge-side molding and/or top molding include one or more hinge pin receivers (typically holes or depressions), optionally fitted with bushings, positioned and adapted to receive one or more hinge pins mounted on a secondary door to form hinges. Alternatively, hinge pins may be mounted on the hinge-side molding or hinge end of the top molding and corresponding hinge pin receivers and bushings may be provided in the secondary door, or the secondary door may include one hinge pin and one hinge pin receiver.

The primary door molding may include a latch-side molding adapted to engage with latch mechanisms of a secondary door, such as the bolt of the secondary door latch. In exemplary embodiments, a latch-side molding includes a door latch channel positioned to receive the bolt of the secondary door latch. In exemplary embodiments, the latch-side molding includes a strike plate or is configured for mounting a strike plate positioned to receive the bolt of the secondary door latch. Alternatively, the primary door molding and secondary door may be rotatably connected by one or more traditional hinges comprising a leaf attached to the hinge-side molding, a leaf attached to the hinge side of the secondary door, and a hinge pin which is dropped through the hinge leaves once the door is placed near the hinge-side jamb and the hinge leaves are aligned.

The primary door molding may be mounted to the primary door frame by any suitable mechanism, including mechanical fastening devices such as screws, rivets, nails, staples, dowels, customized mechanical connectors, and the like, and may additionally or alternatively use adhesives, welding, or combinations thereof. Optionally, the primary door molding and primary door frame are permanently joined (such as by welding, permanent adhesive, permanent fasteners, or methods that cannot be reversed non-destructively) to form an integral construction. Optionally, the primary door molding and primary door frame are joined by projections such as hooks or pegs to engage receiving features such as V-shaped or keyhole-shaped holes. In some embodiments, including the embodiment illustrated in FIGS. 10 through 12*c* discussed below, the primary door molding includes mounting flanges which extend in a direction generally orthogonal to the plane of the closed position of the secondary door along an inner portion of the hinge-side and latch-side jambs. The primary door molding may be attached to the primary door frame by attachment of the mounting flanges to the inner portions of the hinge- and latch-side jambs.

In embodiments, including the embodiment illustrated in FIGS. 13 through 16 discussed below, a mounting adapter is additionally provided to assist in a desirable door installation that allows for at least some adjustability. Like the mounting flange discussed above, the mounting adapter may include an orthogonal portion which extends in a direction generally orthogonal to the plane of the closed position of the secondary door along an inner portion of the hinge- and latch-side jambs and may be attached to the inner portion of the hinge- and latch-side jambs. The mounting adapters additionally include channel segments which are positionable in mounting adapter channels provided in the hinge and/or latch-side moldings. This embodiment allows the primary door molding some degree of motion relative to the primary door frame so that the position and fit of the molding may be adjusted after installation, vertically or laterally, and the hinge- and latch-side moldings may be adjusted to true vertical orientation. Optionally, after installation of the primary/secondary door system and adjustment of the position of the primary door molding, the primary door molding may be affixed directly to elements of the primary door frame to eliminate this adjustability or play.

The various parts and elements of the primary/secondary door system may be made of any suitable materials, which are not particularly limited. Such materials may include exemplary materials including wood, metal (such as aluminum or steel), extruded or molded plastics, resin/matrix composites such as fiberglass, other suitable materials, or a combination of these or other suitable materials.

Figure 2:
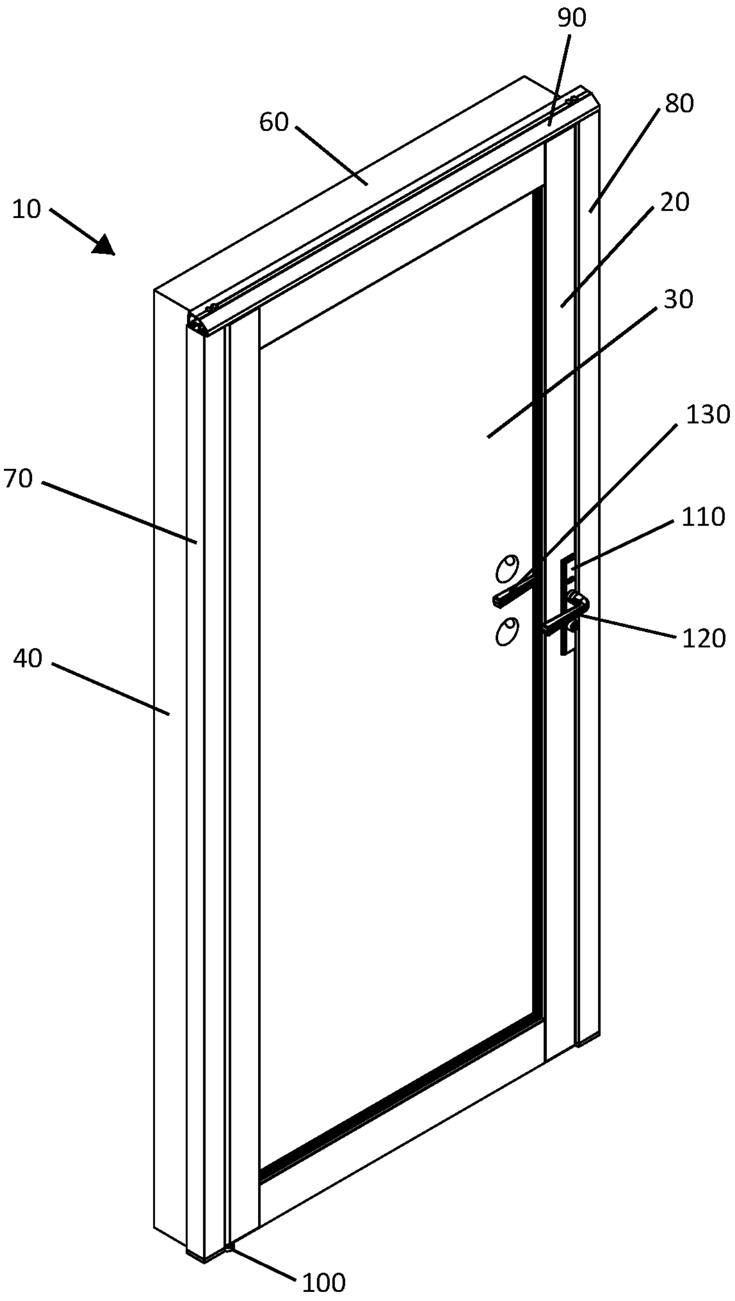
FIG. 2 is an isometric view of a primary/secondary door system as assembled with primary and secondary doors in a closed position.
Figure 3:
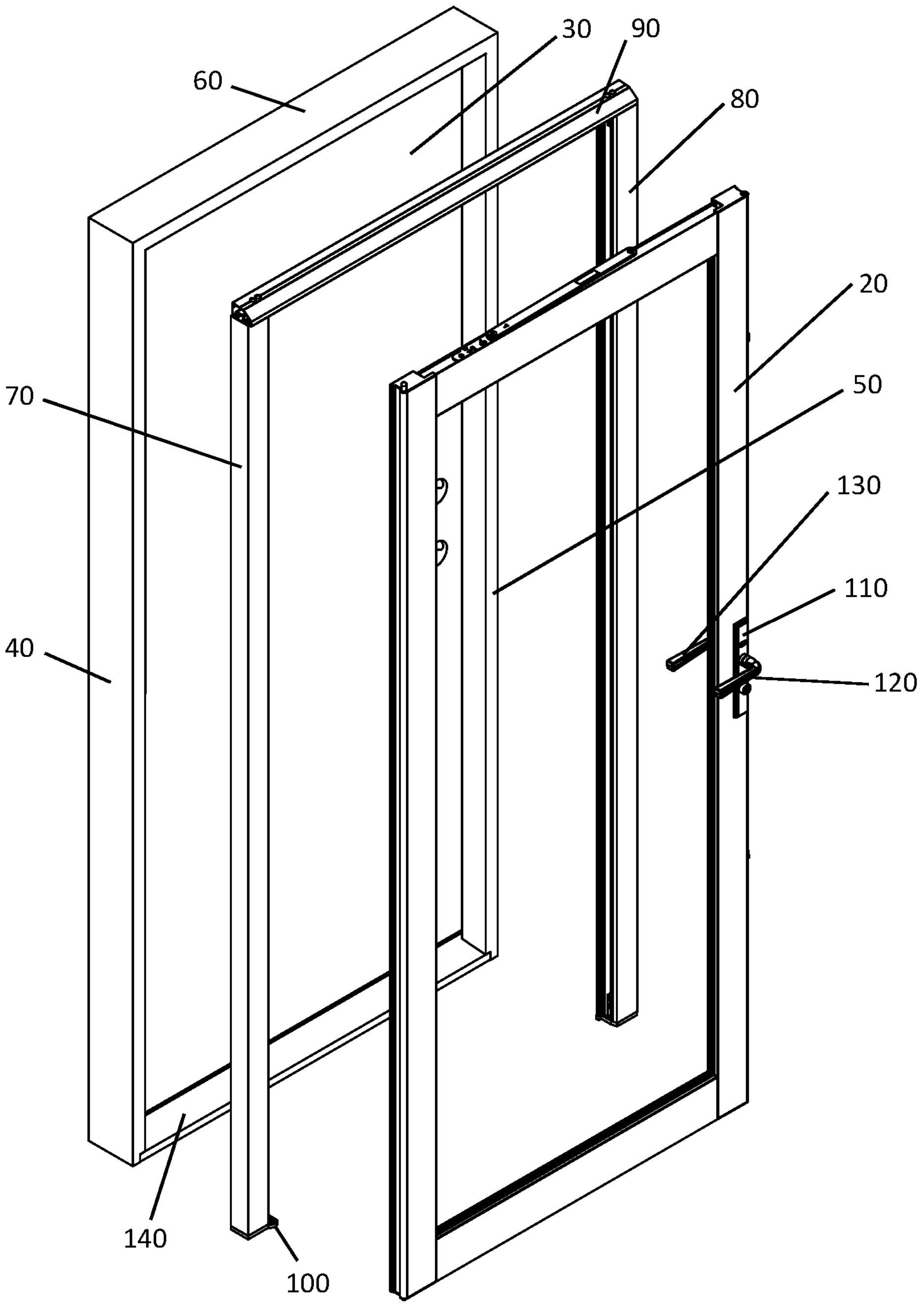
FIG. 3 is an exploded isometric view of a primary/secondary door system with the primary door in a closed position.

Referring to exemplary FIGS. 1 through 3, an assembled primary/secondary door system 10 is illustrated, which includes a secondary door 20 that is commonly referred to as a screen door, a storm door, or security door, for example. Secondary door 20 may be of any suitable style and may include single or multiple transparent panels, opaque panels, screening panels, metal or mesh grilles, and the like. In this illustrated embodiment, secondary door 20 comprises a glass panel through which primary door 30 is visible. Primary/secondary door system 10 additionally includes a hinge-side jamb 40, a latch-side jamb 50, a head 60, and a sill 140, which together comprise a primary door frame. Elements of the primary door frame may be fastened together by any suitable mechanism, including mechanical fastening devices such as screws, rivets, nails, staples, dowels, customized mechanical connectors, and the like, and may additionally or alternatively use adhesives, welding, or combinations thereof.

Primary/secondary door system 10 additionally comprises a hinge-side molding 70, a latch-side molding 80, and a top molding 90, which together comprise a primary door molding 90. Elements of the primary door molding 90 may be fastened together by any suitable mechanism, including mechanical fastening devices such as screws, rivets, nails, staples, dowels, customized mechanical connectors, and the like, and may additionally or alternatively use adhesives, welding, or combinations thereof. The primary door molding 90 may additionally utilize intermediate structures in combination with mechanisms such as inserts comprising two perpendicular legs positioned in each corner. Likewise, the primary door molding 90 may be attached to the primary door frame by any suitable mechanism, including mechanical fastening devices such as screws, rivets, nails, staples, dowels, customized mechanical connectors, and the like; adhesives; welding; or combinations thereof.

In embodiments, the combination of the primary door molding 90 and the primary door frame are configured as an integral construction. In some embodiments, hinge-side jamb 40 and hinge-side molding 70 are a unitary article (i.e. a single unified part such as would be made in a single molding, extrusion, or machining). Similarly, latch-side jamb 50 and latch-side molding 80 may be a unitary article, and/or head 60 and top molding 90 may be a unitary article. In embodiments, it is possible for only a single molding to be provided that cooperates with other structure(s) for mounting of a secondary door.

In an embodiment, hinge-side molding 70 comprises an extending hinge plate or element 100 with a rotatably engageable element (e.g. an aperture or pin-receiving member) that receives a hinge pin (not visible in FIGS. 1-3) extending from secondary door 20. In embodiments, the hinge plate or element 100 extends from a distal end of the hinge-side molding 70; however, the hinge plate or element 100 can be spaced vertically from the distal end of the hinge-side molding.

Secondary door 20 includes secondary door hardware 110 with secondary door exterior handle 120 and secondary door interior handle 130, which may include any of a number of available door hardware configurations. The present figures illustrate a left-hinge out-swinging secondary door 20 and a left-hinge in-swinging primary door 30; however, it is understood that any combinations of left-hinge and right-hinge primary and secondary doors are also contemplated. Optionally, the position of the inner edge of at least one of hinge-side molding 70 and latch-side molding 80, are adjustable (e.g., by provision of a telescoping or extending sections, so that the inside edge of the molding can be adjusted before, while, or after secondary door is attached to the molding in order to get the proper spacing and clearance between the molding and the secondary door).

Figures 4A, 4B, 4C:
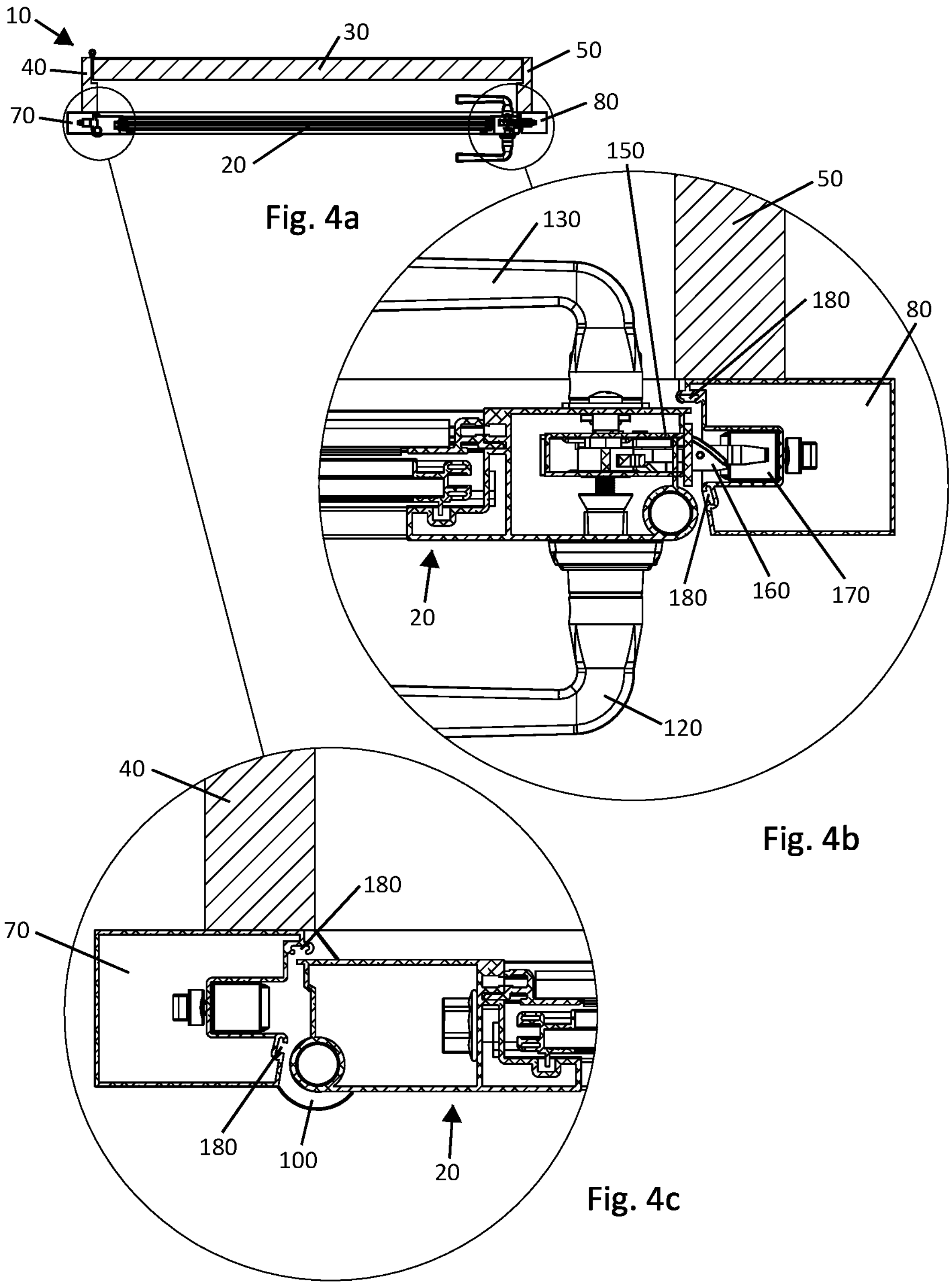
FIGS. 4*a*, 4*b*, and 4*c* are cross-sectional views of the primary/secondary door system of FIG. 1 taken along section line A-A (FIG. 4*a*), along with enlarged views of a secondary door latch mechanism and a latch-side molding (FIG. 4*b*) and of a hinge-side molding (FIG. 4*c*)

FIGS. 4*a*, 4*b* and 4*c* include cross-sectional views taken along section line A-A of FIG. 1 of a secondary door latch mechanism and latch-side molding 80 (FIG. 4*b*) and of hinge-side molding 70 (FIG. 4*c*). With particular reference to FIG. 4*b*, a secondary door exterior handle 120 and secondary door interior handle 130 may be used to operate secondary door latch mechanism 150 to withdraw secondary door latch bolt 160. Secondary door latch bolt 160 engages with secondary door latch channel 170 to hold the secondary door 20 closed. In some embodiments, secondary door latch channel 170 is continuous down the length of latch-side molding 80 such that latch-side molding 80 has a constant cross section and may therefore be produced by a continuous process such as an extrusion process. In various embodiments, one, two, or all three of hinge-side molding 70, latch-side molding 80, and top molding 90 have a constant cross section and may therefore be produced by a continuous process such as an extrusion process. In embodiments, hinge-side molding 70 may also include secondary door latch channel 170 to accommodate left-opening and right-opening door installations, and so that hinge-side molding 70 and latch-side molding 80 have the same profile (flipped end to end) and can therefore be made in the same process.

With reference to FIGS. 4*b* and 4*c*, weatherstrip channels 180 can be provided to hold flexible weatherstrip (not shown) so that secondary door 20, acting together with primary door molding 70, 80, and 90, may provide a barrier to wind, precipitation, and insects and other pests. In the depicted embodiment, weatherstrip channels 180 are located so that weatherstrip is not visible when secondary door 20 is closed. Since weatherstrip is often not paintable, this reduces the amount of visible surface and enables a more attractive door system having no visible unpaintable surfaces (in the closed position), other than transparent or screen panels (when present).

Figure 5A:
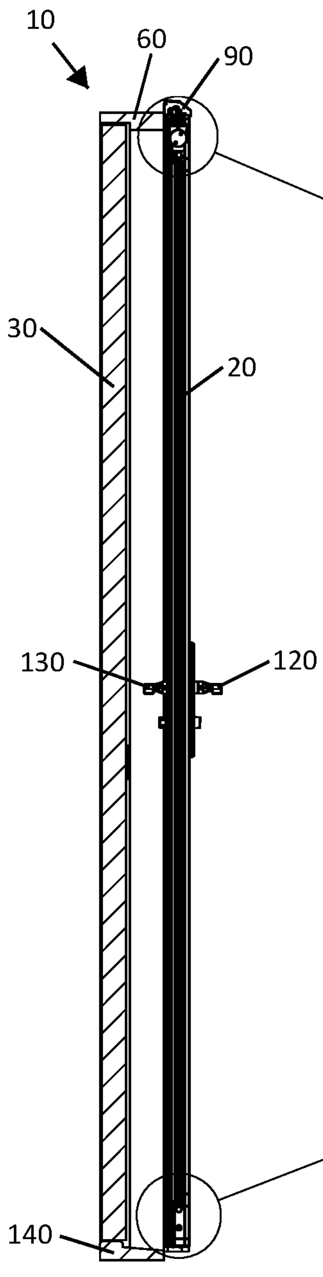
FIGS. 5*a*, 5*b*, and 5*c* are cross-sectional views of the primary/secondary door system of FIG. 1 taken along section line B-B (FIG. 5*a*), along with enlarged views of a top molding and top details of a secondary door (FIG. 5*b*) and of bottom details of a secondary door (FIG. 5*c*)
Figure 5B:
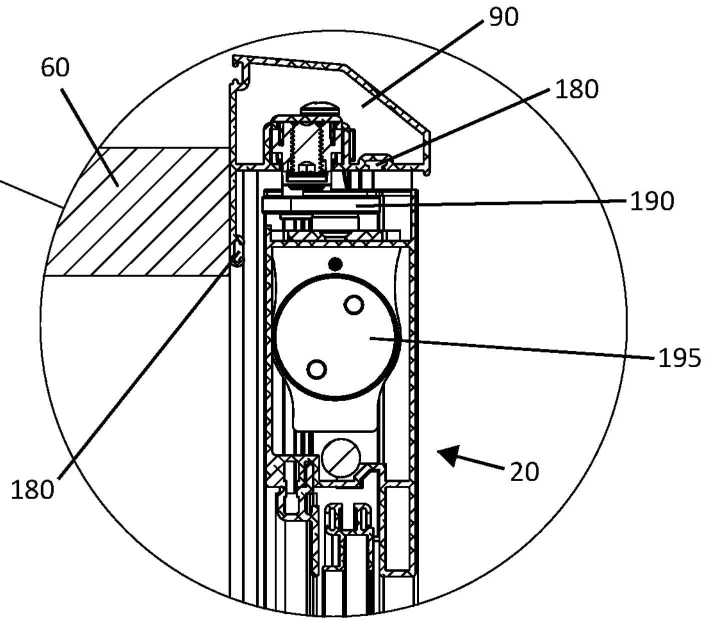
Figure 5C:
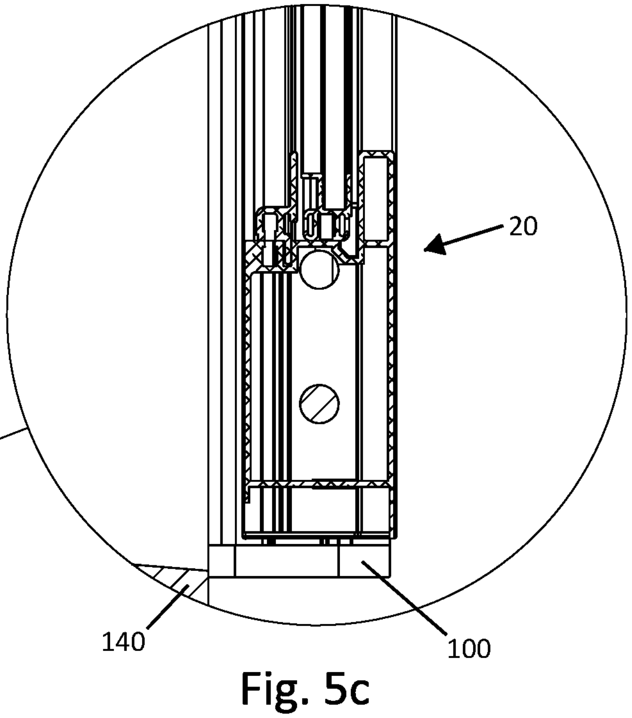

FIGS. 5*a*, 5*b* and 5*c* include cross-sectional views taken along section line B-B of FIG. 1 and illustrate top molding 90 and top details of secondary door 20 (FIG. 5*b*) and bottom details of secondary door 20 (FIG. 5*c*). In the illustrated embodiment, weatherstrip channels 180 are located such that weatherstrip is not visible when secondary door 20 is closed, as addressed above. A door closer arm 190 and door closer 195 optionally form a part of a door-mounted door closer mechanism. Door closer arm 190 is visible in an extended position in FIGS. 6*a*, 7*a*, 8*a*, and 9*a*. With a door-mounted door closer system, the closer is concealed in the top of the door. Alternately, a frame-mounted door closer system may be used, in which case the closer may be housed in the top molding, or the door closer may be omitted. In other alternate embodiments, closer arm 190, which is a straight arm, may be replaced with a hinged arm made from two or more segments. Door closers disclosed in U.S. patent application Ser. Nos. 15/382,275, 15/385,091, 15/911,639, 15/911,690, and 16/914,850, which are incorporated herein by reference, may be used in the practice of the present door systems. The primary door may additionally be equipped with a door-mounted or frame-mounted closer.

Figure 6A:
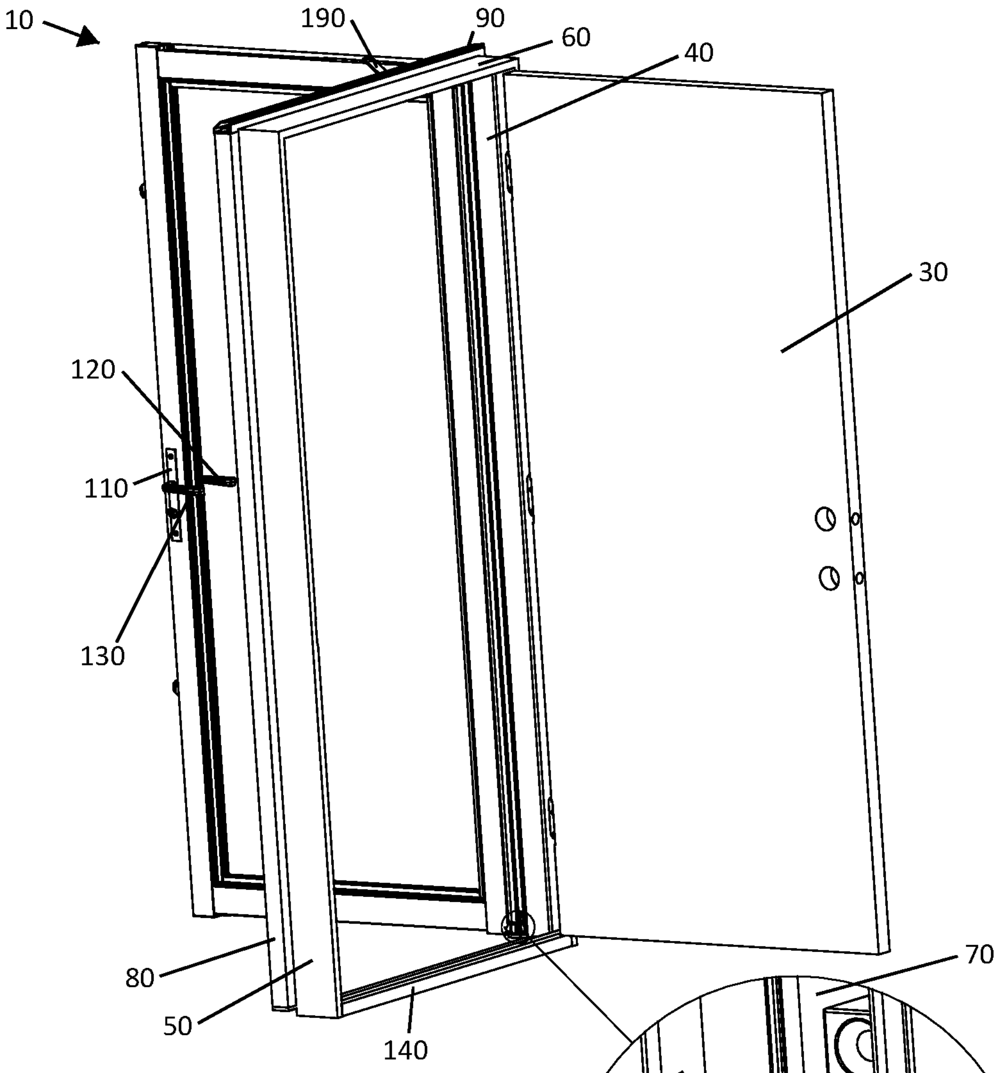
FIGS. 6*a* and 6*b* are isometric views of a primary/secondary door system as assembled with primary and secondary doors in an open position (FIG. 6*a*) and an enlarged view of a bottom hinge mechanism with a cutaway of the hinge pin mechanism of the secondary door (FIG. 6*b*)
Figure 6B:
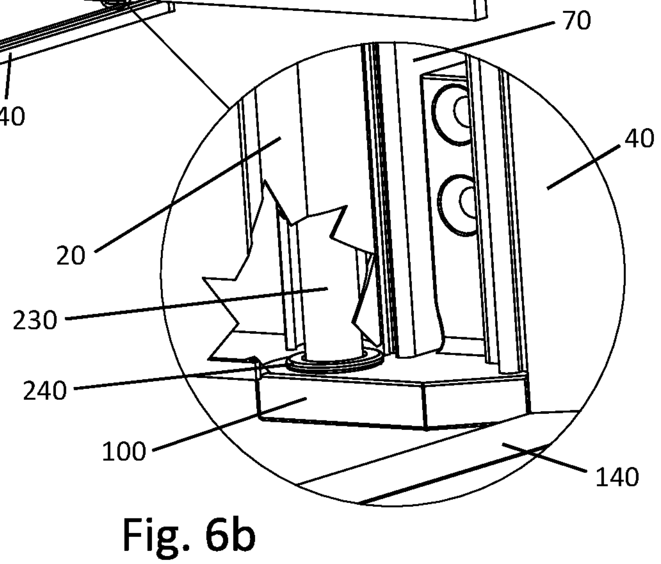
Figure 7A:
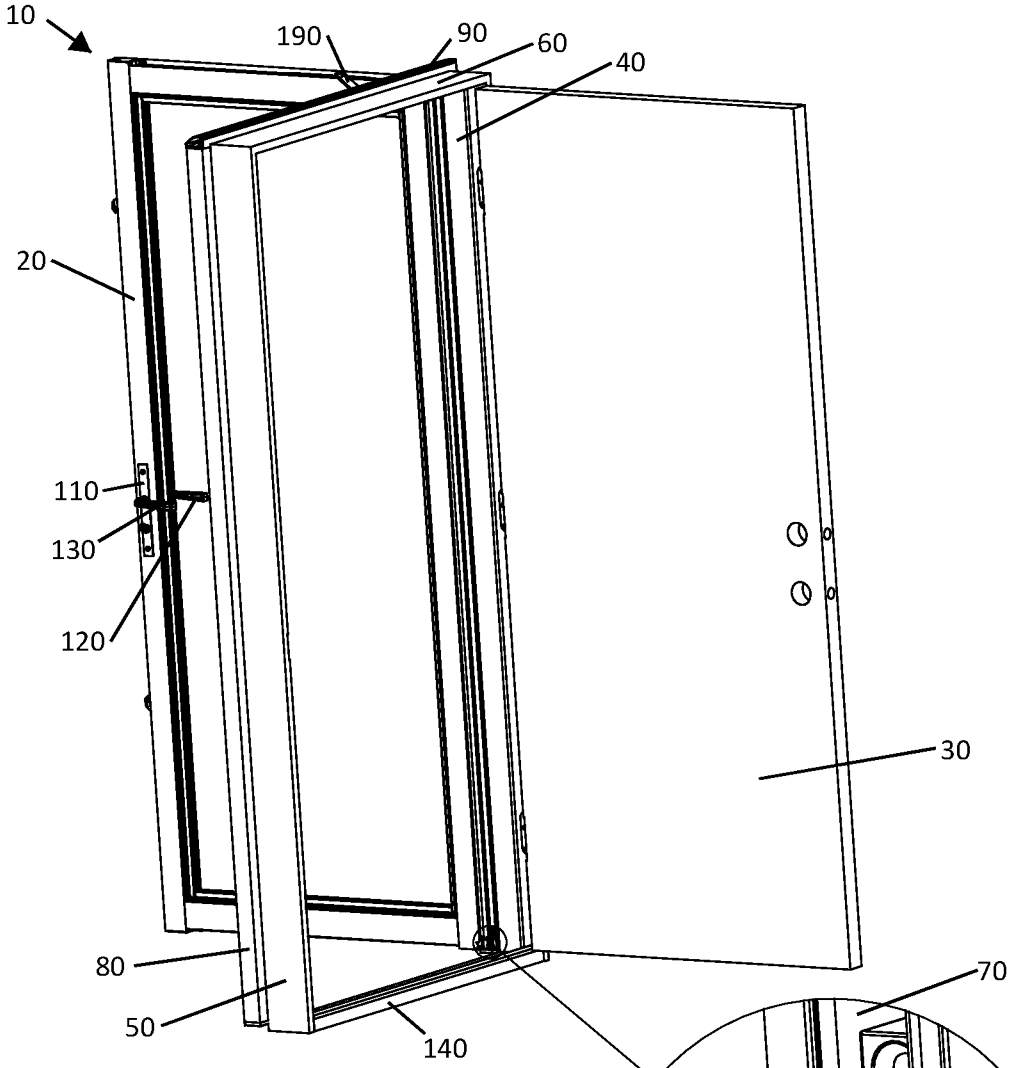
FIGS. 7*a* and 7*b* are isometric views of a primary/secondary door system as assembled with primary and secondary doors in an open position (FIG. 7*a*) and an enlarged view of a bottom hinge mechanism with the secondary door removed (FIG. 7*b*)
Figure 7B:
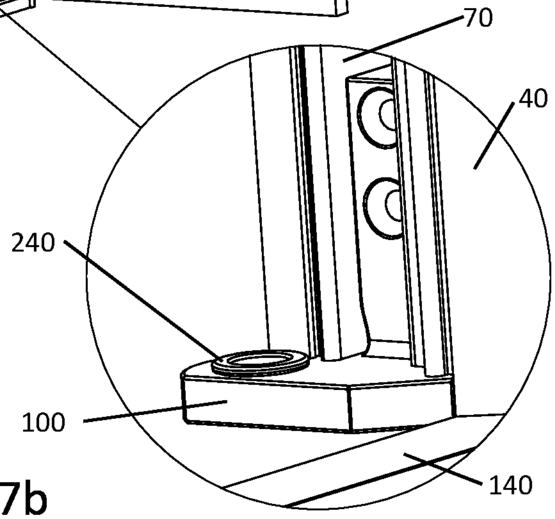

FIGS. 6*a* and 7*a* are views of an exemplary door system with primary and secondary doors in an open position, and FIGS. 6*b* and 7*b* are enlarged views of a bottom hinge mechanism. In particular, FIG. 6*b* illustrates a cutaway of the bottom hinge area with a hinge pin of a secondary door 20 engaged with the hinge mechanism, and FIG. 7*b* is an enlarged view of elements of a bottom hinge mechanism without the secondary door. The bottom hinge mechanism includes a rotatably engageable element in the form of a hinge pin 230 extending from the secondary door 20 and an optional bottom hinge bushing 240 installed in an aperture (not visible) provided in the hinge plate 100 to form a rotatably engageable element or hinge pin receiver. Optionally, the hinge-side molding 70 and hinge plate 100 form an integral construction. Bottom hinge pin 230 engages with bottom hinge bushing 240 to form a bottom hinge which bears the greater part of the weight of and provides an axis for rotation of secondary door 20.

With regard to the bottom hinge mechanism or rotatably engageable element, it is contemplated that such a feature is a part of the sill of a primary door frame rather than a hinge plate as described above. In such a configuration, the sill can include either an extending pin or an aperture (which can include a bushing) that is engageable with a corresponding aperture or pin of a secondary door for rotatable engagement between the components. The top of the secondary door will then be rotatably engageable with either a rotatably engageable element of the top molding or of a hinge plate extending from an upper area of a hinge-side molding.

Figure 8B:
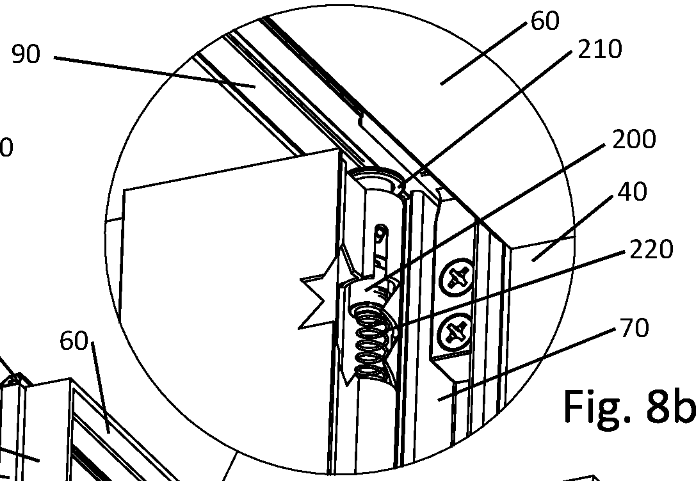
FIGS. 8*a* and 8*b* are isometric views of a primary/secondary door system as assembled with primary and secondary doors in an open position (FIG. 8*a*) and an enlarged view of a top hinge mechanism with a cutaway of the hinge pin mechanism of the secondary door (FIG. 8*b*)
Figure 8A:
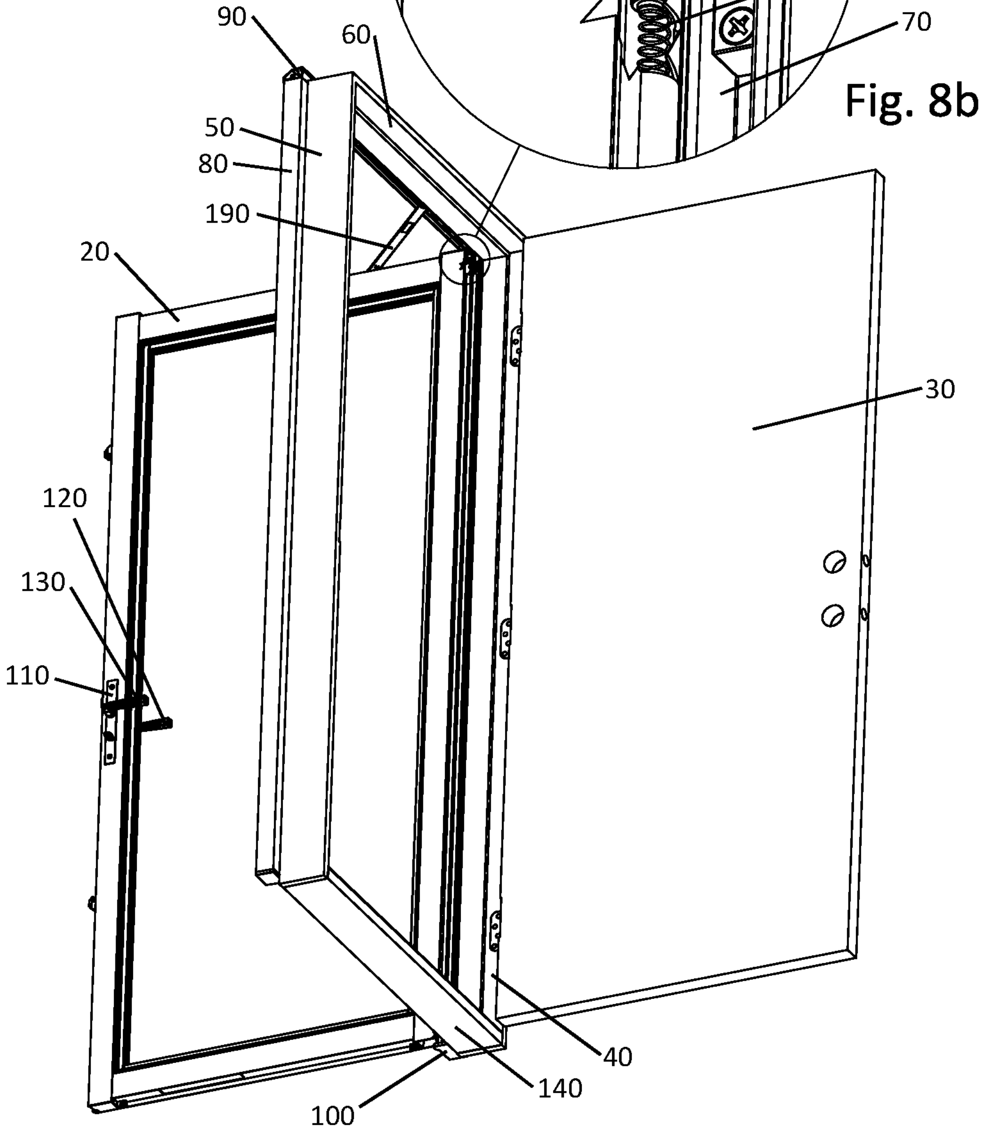
Figures 9A, 9B:
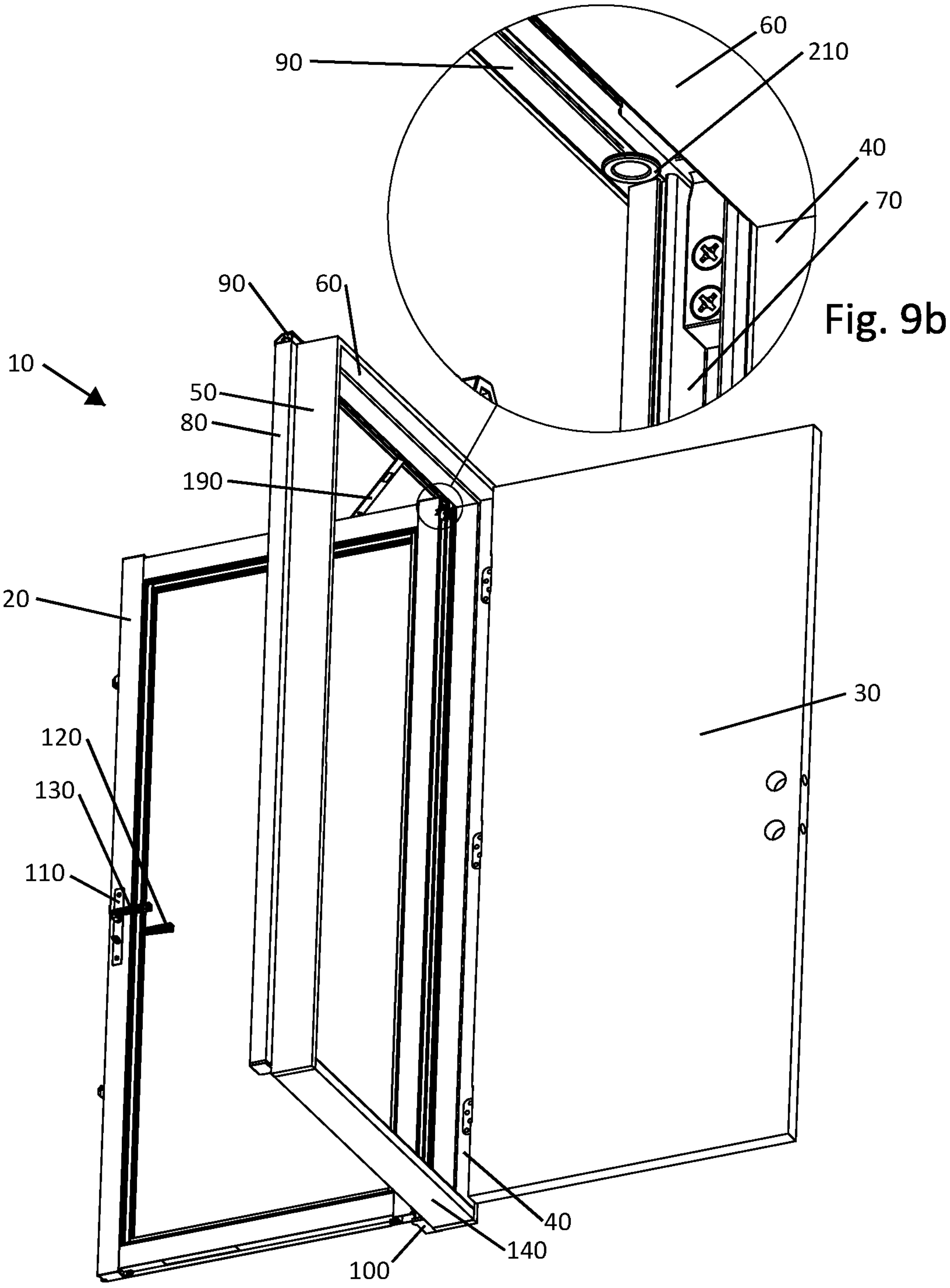
FIGS. 9*a* and 9*b* are isometric views of a primary/secondary door system as assembled with primary and secondary doors in an open position (FIG. 9*a*) and an enlarged view of a top hinge mechanism with the secondary door removed (FIG. 9*b*)
Figure 10:
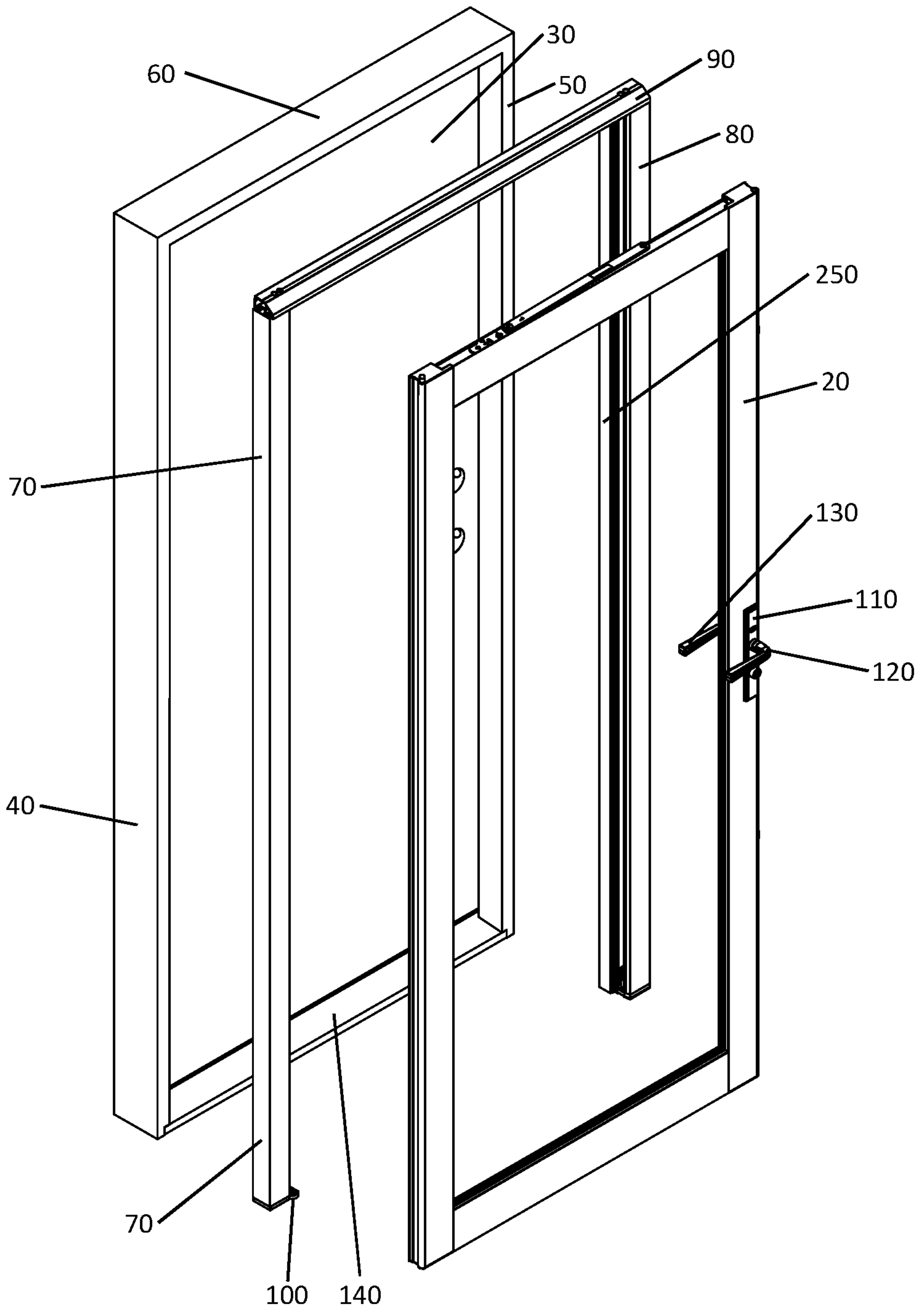
FIG. 10 is an exploded isometric view of a primary/secondary door system with the primary door in a closed position.
Figure 11A:
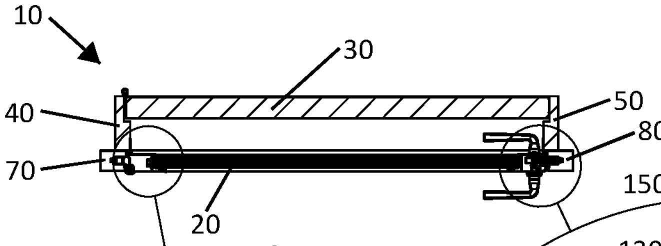
FIGS. 11*a*, 11*b* and 11*c* are cross-sectional views of the primary/secondary door system of FIG. 10 taken along a section line in the same location as section line A-A of FIG. 1 (FIG. 11*a*), and enlarged views of a secondary door latch mechanism and a latch-side molding (FIG. 11*b*) and of a hinge-side molding (FIG. 11*c*)
Figure 11B:
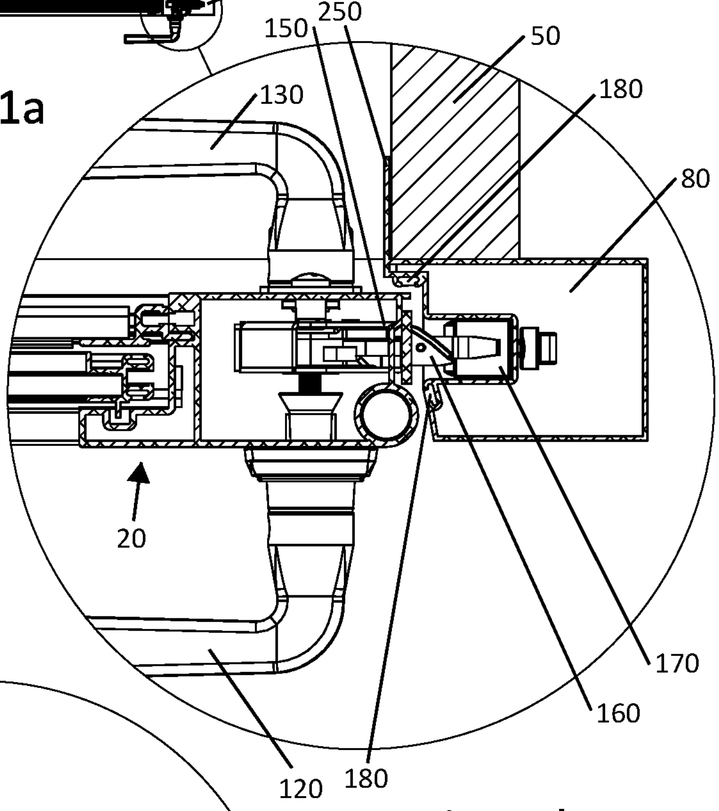
Figure 11C:
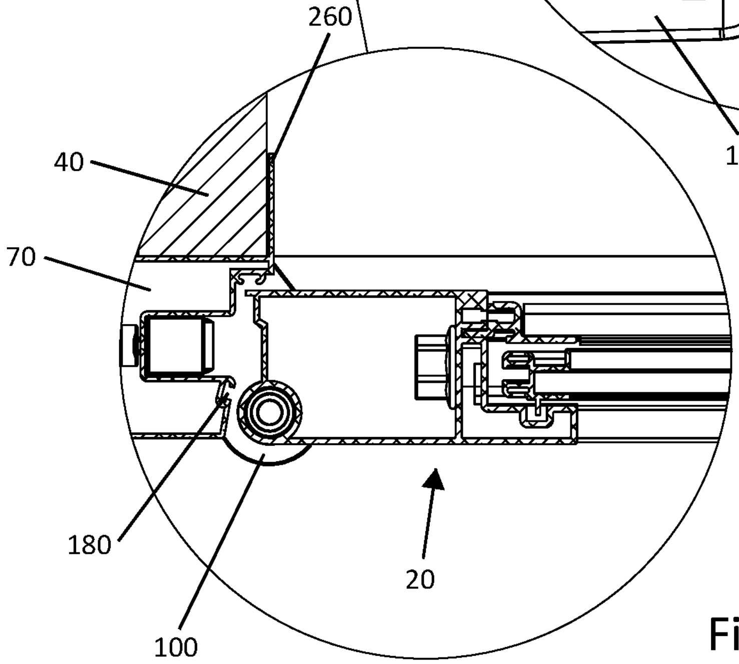
Figure 12A:
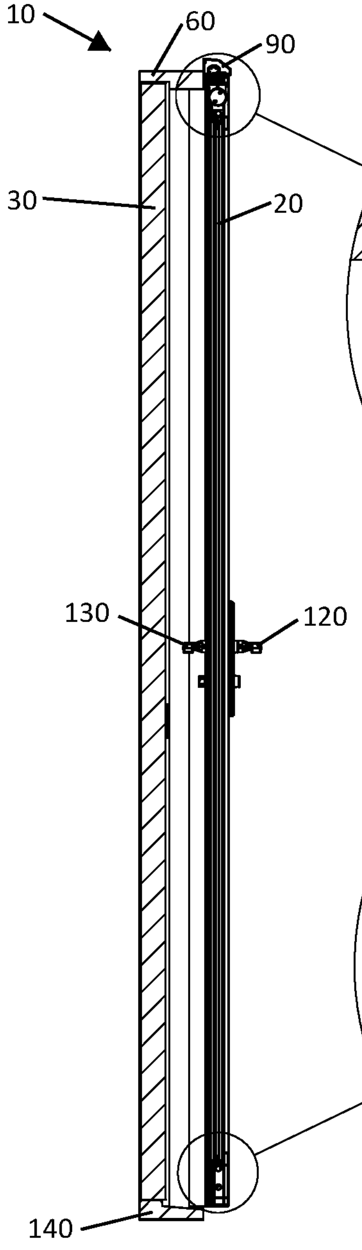
FIGS. 12*a*, 12*b* and 12*c* are cross-sectional views of the primary/secondary door system of FIG. 10 taken along a section line in the same location as section line B-B of FIG. 1 (FIG. 12*a*), and enlarged views of a top molding and top details of a secondary door (FIG. 12*b*) and of bottom details of a secondary door (FIG. 12*c*)
Figure 12B:
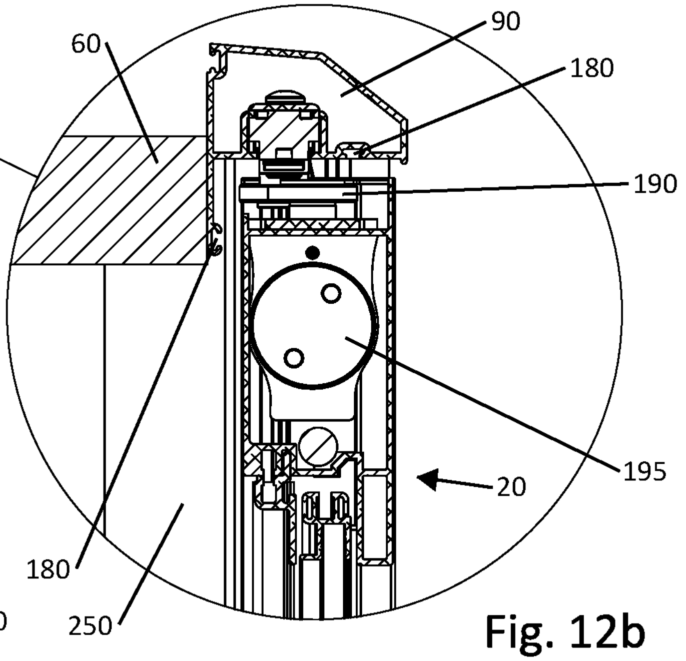
Figure 12C:
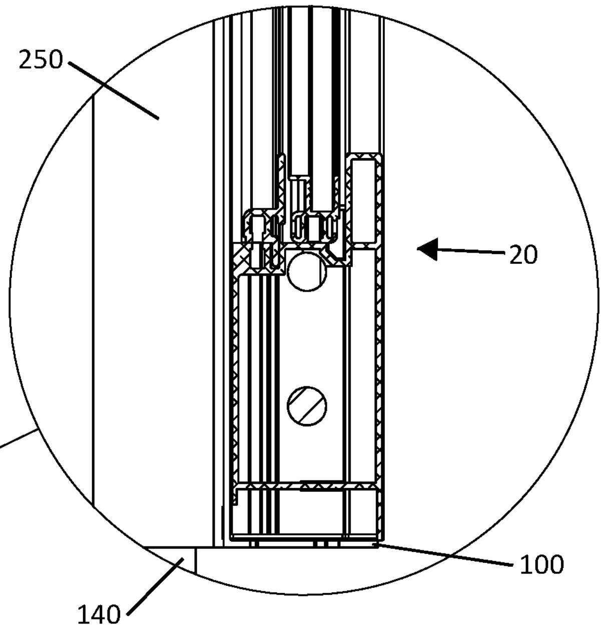
Figure 13:
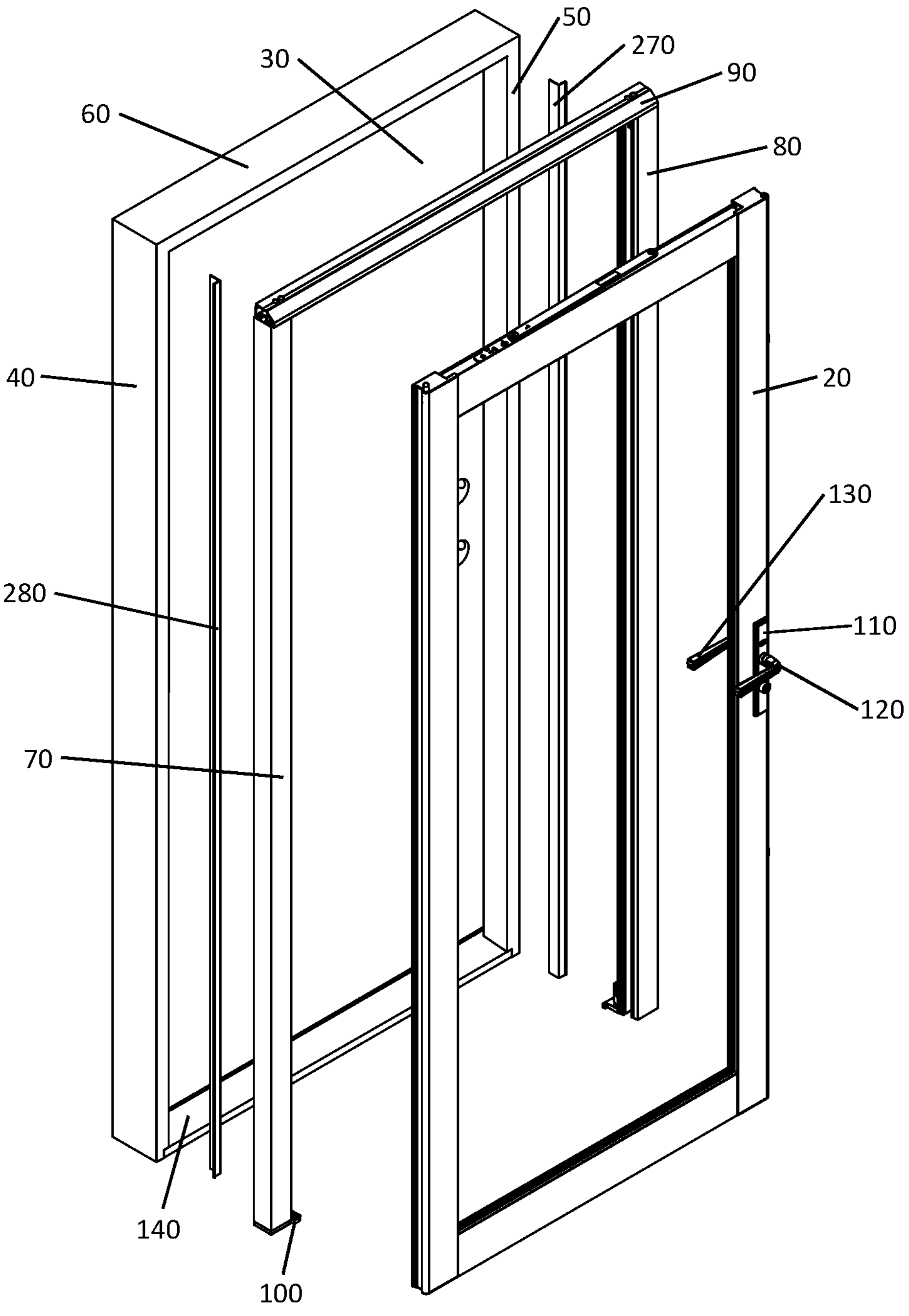
FIG. 13 is an exploded view of a primary/secondary door system with the primary door in a closed position.
Figures 14A, 14B, 14C:
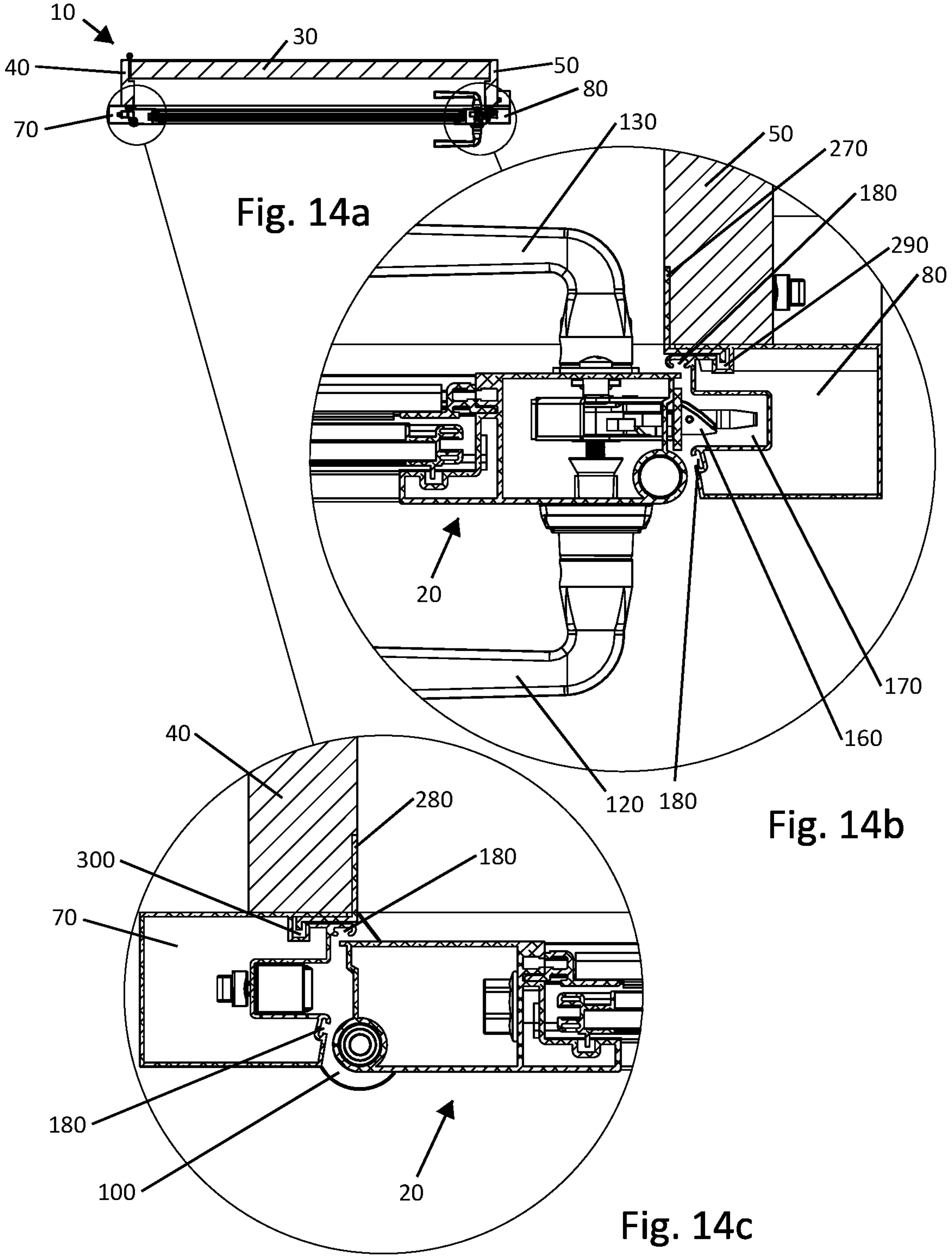
FIGS. 14*a*, 14*b* and 14*c* are horizontal cross-sectional views of the primary/secondary door system of FIG. 13 taken along a section line in the same location as section line A-A of FIG. 1 (FIG. 14*a*) and enlarged views of a secondary door latch mechanism and a latch-side molding (FIG. 14*b*) and of a hinge-side molding (FIG. 14*c*)
Figures 15A, 15B, 15C:
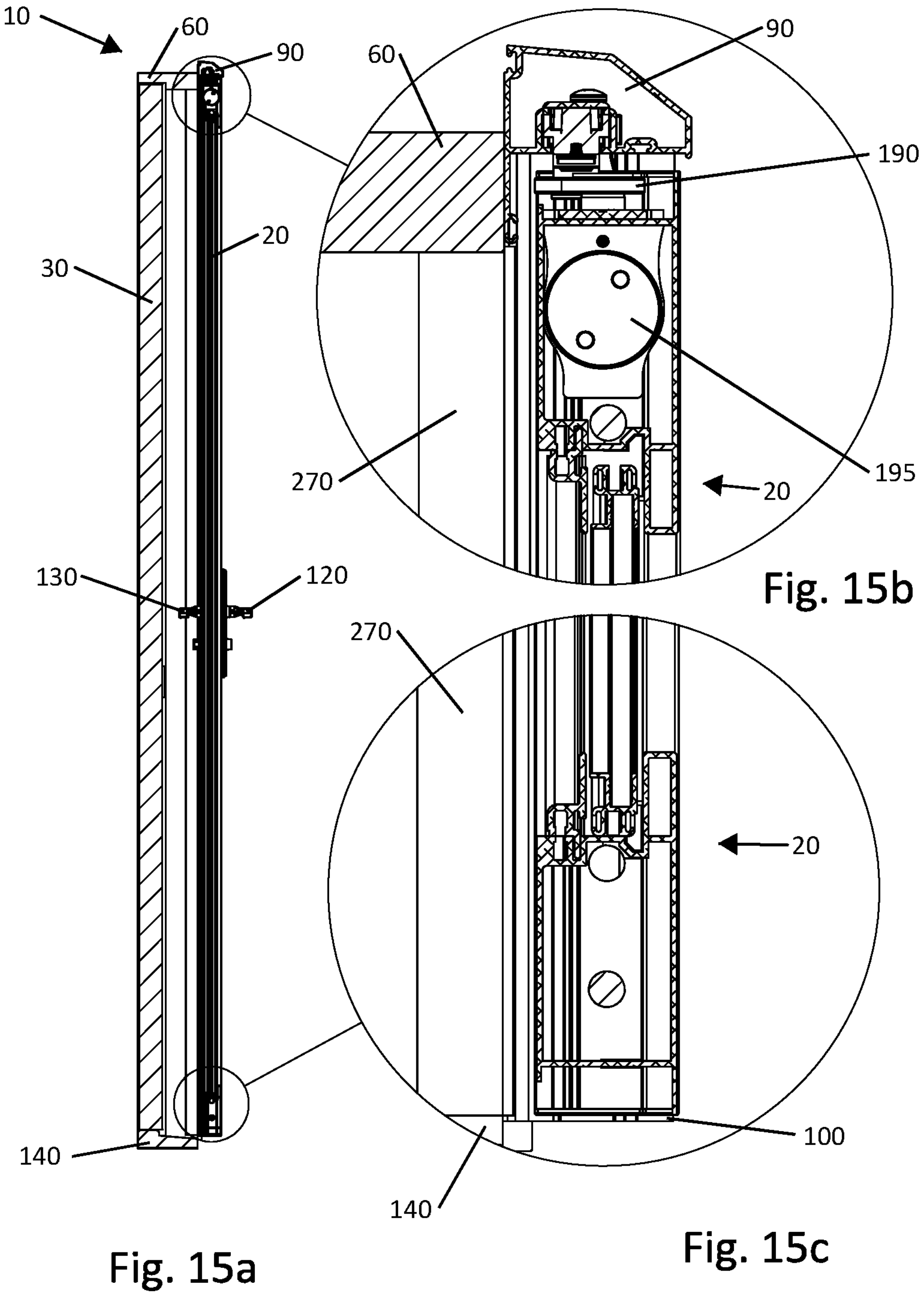
FIGS. 15*a*, 15*b* and 15*c* are vertical cross-sectional views of the primary/secondary door system of FIG. 13 taken along a section line in the same location as section line B-B of FIG. 1 (FIG. 15*a*), and enlarged views of a top molding and top details of a secondary door (FIG. 15*b*) and of bottom details of a secondary door (FIG. 15*c*)
Figure 16:
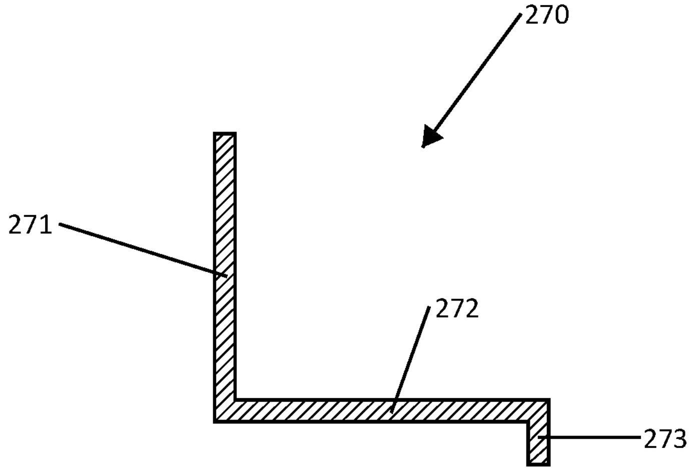
FIG. 16 is a cross-section of a mounting adapter of the type illustrated in FIG. 13.

FIGS. 8*a*, 8*b*, 9*a*, and 9*b* illustrate a top hinge mechanism of one embodiment of an assembled primary/secondary door system 10. FIG. 8*b* is an enlarged view of the top hinge mechanism with a cutaway of the hinge pin mechanism internal to secondary door 20. FIG. 9*b* is an enlarged view of elements of a top hinge mechanism without the secondary door. The top hinge mechanism includes a rotatably engageable element in the form of a top hinge pin 200, a top hinge bushing 210 installed in an aperture (not visible) provided in the top molding 90 to form a hinge pin receiver, and a top hinge pin biasing member 220. Hinge pin biasing member 220, which can include a spring, urges top hinge pin 200 to an extended position. During installation, after a bottom hinge pin (e.g., hinge pin 230) is engaged with a rotatably engageable element (e.g., a bottom hinge bushing), top hinge pin 200 may be pushed against hinge pin biasing member 220, located in alignment with top hinge bushing 210, and allowed to revert to an extended position to engage with the rotatably engageable element to form a top hinge. However, it is understood that both the bottom hinge pin 230 and top hinge pin 200 may be retractable and extendable, or that only the bottom hinge pin 230 is retractable and extendable.

Figure 17B:
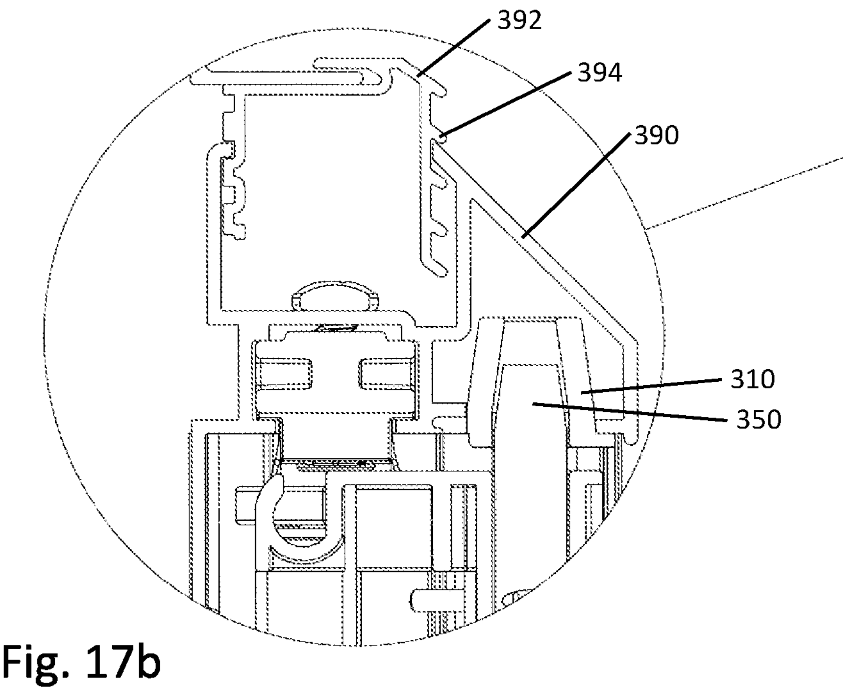
FIGS. 17*a*, 17*b*, and 17*c* are vertical cross-sectional views of the primary/secondary door system of FIG. 1 taken along section line C-C (FIG. 17*a*), along with enlarged views of a top molding and top details of a secondary door (FIG. 17*b*) and of bottom details of a secondary door (FIG. 17*c*)
Figure 17C:
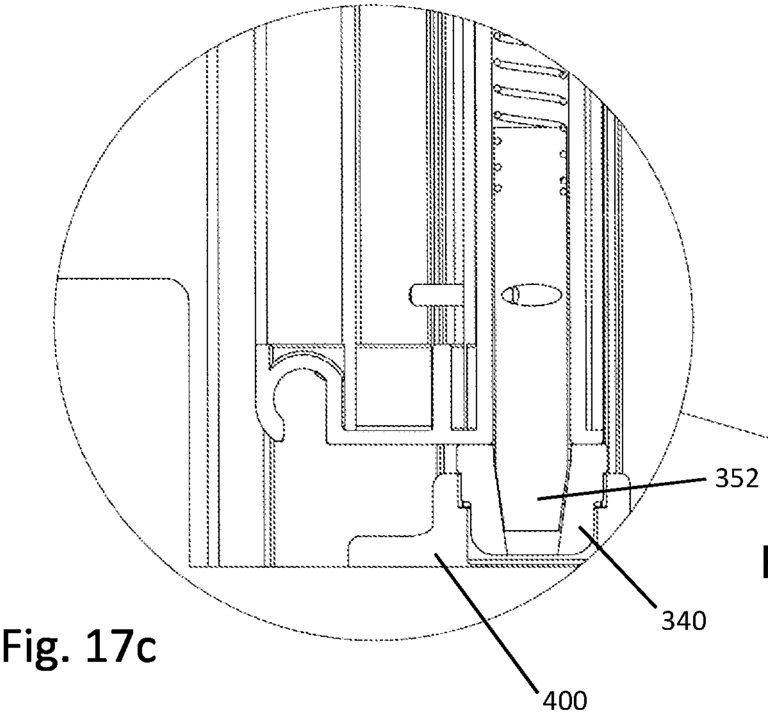
Figure 17A:
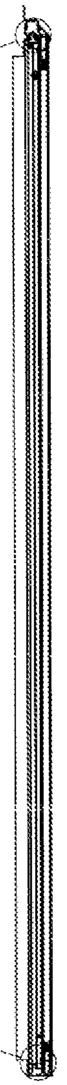

FIGS. 17*a*, 17*b* and 17*c* include cross-sectional views taken along section line C-C of FIG. 1 and illustrate enlarged views of a top molding 390 engaged with a rotatably engageable element of a secondary door (FIG. 17*b*) and bottom details of a rotatably engageable element of a secondary door engaged with a hinge plate 400 (FIG. 17*c*). In particular, FIG. 17*b* illustrates top molding 390 with an aperture in which a bushing 310 is positioned. As shown, the bushing 310 is tapered to provide a cone-shaped inner aperture configured to accept an inserted pin 350 with a tapered distal end. Similarly, FIG. 17*c* illustrates a hinge plate 400 that extends from a vertical molding and that includes an aperture in which a bushing 340 is positioned. As shown, the bushing 340 is tapered to provide a cone-shaped inner aperture configured to accept an inserted pin 352 with a tapered distal end. The tapered portions of the pins 350, 352 cooperate with the tapered portions of their respective bushings 310, 340 to help the pins 350, 352 self-align and self-center themselves, thereby providing for an easier installation. While these tapered members are illustrated both at the top and the bottom of the hinge-side molding 70, it is understood that such tapered elements may only be provided at one of these locations.

With further reference to FIG. 17*a*, an optional top molding extender 392 is engaged with the top molding 390. As shown, the top molding extender 392 is configured with multiple extensions 394 that are adjustably engageable with structure of the top molding 390 and/or other structure to achieve a desired vertical positioning of the top molding extender relative to the structure to which the door molding is installed. Other top molding extender positioning mechanisms are contemplated, including but not limited to detents, mating grooves, fasteners, friction, adhesives, and the like. The top molding extender is configurable to accommodate installations that involve differing wall depths and door heights In an alternate embodiment, the top hinge pin receiver is configured similar to the bottom hinge pin receiver using an upper hinge plate that extends from hinge-side molding 70 and which is spaced vertically from the hinge plate 100 positioned at the lower portion or distal end of the molding 70. In such an embodiment, the top hinge pin 200 will be engaged with a rotatably engageable element or aperture/bushing of the hinge plate rather than an aperture/bushing of the top molding 90. In another embodiment, one or more of the hinge plates and hinge pin receivers may be located at an intermediate position along the hinge side molding, with rotatably engageable hinge pins located at corresponding along the hinge-side edge of the secondary door. In yet another alternate embodiment, the top molding 90 comprises top hinge pin receivers or rotatably engageable elements on both left and right sides to accommodate left-opening and right opening door installations.

FIGS. 10 through 12*c* represent an alternate mechanism for attachment of the primary door molding to the primary door frame. In this embodiment, latch-side molding 80 comprises a latch-side mounting flange 250 which extends in a direction generally orthogonal to the plane of the closed position of the secondary door 20 and contacts an inner portion of latch-side jamb 50. Similarly, hinge-side molding 70 comprises a hinge-side mounting flange 260 which extends in a direction generally orthogonal to the plane of the closed position of the secondary door and contacts an inner portion of hinge-side jamb 40. In various embodiments, mounting flanges 250, 260 are attachable to jambs 40, 50 by any suitable mechanism, including mechanical fastening devices such as screws, rivets, nails, staples, dowels, customized mechanical connectors, and the like, and may additionally or alternatively use adhesives, welding, or combinations thereof. Latch-side molding 80 and latch-side mounting flange 250 may comprise a unitary construction, although they may be separate pieces joined together. Similarly, hinge-side molding 70 and hinge-side mounting flange 260 may comprise a unitary construction, although they may be separate pieces joined together. Other elements of FIGS. 10 through 12*c* can include similar features and functionality as described above with regard to FIGS. 1-9.

FIGS. 13 through 16 represent another feature that can be used for attachment of a primary door molding to a primary door frame. This embodiment utilizes mounting adapters such as a latch-side mounting adapter 270, which is illustrated in cross-section in FIG. 16. In particular, latch-side mounting adapter 270 includes attachment segment of a latch-side mounting adapter 271 which, when installed, extends in a direction generally orthogonal to the plane of the closed position of the secondary door and contacts an inner portion of latch-side jamb 40. Latch-side mounting adapter 270 includes a channel segment of latch-side mounting adapter 272 which, when installed, resides in a latch-side mounting adapter channel 290. After installation, a holding segment 273 of latch-side mounting adapter 270 maintains latch-side mounting adapter 270 in the latch-side mounting adapter channel 290 in a lateral direction. The preceding description applies similarly to a hinge-side mounting adapter 280 (which can have the same general configures as the latch-side mounting adapter 270) and a corresponding hinge-side mounting adapter channel 300.

Latch-side and hinge-side mounting adapters 270, 280 may be identical if turned end-to-end, as they are in the depicted embodiment, which can be useful for design and manufacturing considerations. Mounting adapters 270, 280 are attached to jambs 40, 50 by any suitable mechanism, including mechanical fastening devices such as screws, rivets, nails, staples, dowels, customized mechanical connectors, and the like, and may additionally or alternatively use adhesives, welding, or combinations thereof. Mounting of the primary door molding on the primary door frame by the mechanism of mounting adapters 270, 280 traveling in mounting adapter channels 290, 300 permits a limited amount of vertical and lateral movement of the primary door molding relative to the primary door frame. Optionally, after installation of primary/secondary door system 10 and adjustment of the position of the primary door molding, elements of the primary door molding may be affixed directly to elements of the primary door frame by any of the attachment mechanisms described above to prevent further movement of the primary door molding. Other elements of FIGS. 13 through 15*c* can include similar features and functionality as described above with regard to FIGS. 1-9.

A primary/secondary door system according to an embodiment of the present disclosure includes the primary door frame (which includes hinge- and latch-side jambs, head, and sill) and the primary door molding (which includes hinge- and latch-side molding and top molding) assembled together. Optionally, these components form an integral construction. The primary/secondary door system additionally includes a primary door rotatably attached by hinges to the primary door frame. The primary/secondary door system (minus secondary door) can be installed (e.g., in a door opening in a commercial or residential building) in the customary manner for a primary door. Optionally, the primary door molding is anchored or attached to the building surface. The primary/secondary door system is then ready for mounting of the secondary door on the primary door molding.

Figure 18:
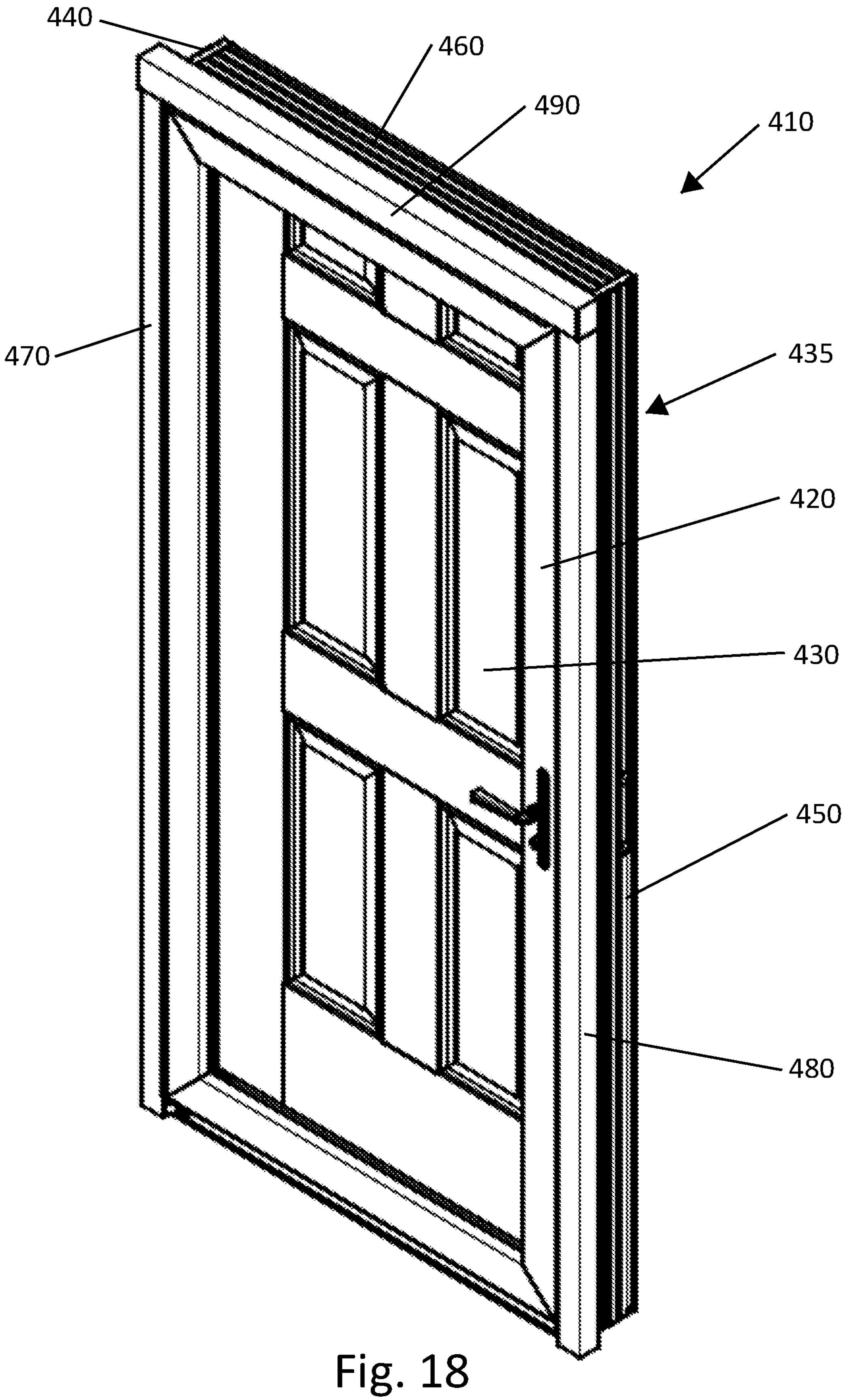
FIG. 18 is an isometric view of an embodiment of a primary/secondary door system as assembled with primary and secondary doors in a closed position.
Figure 19:
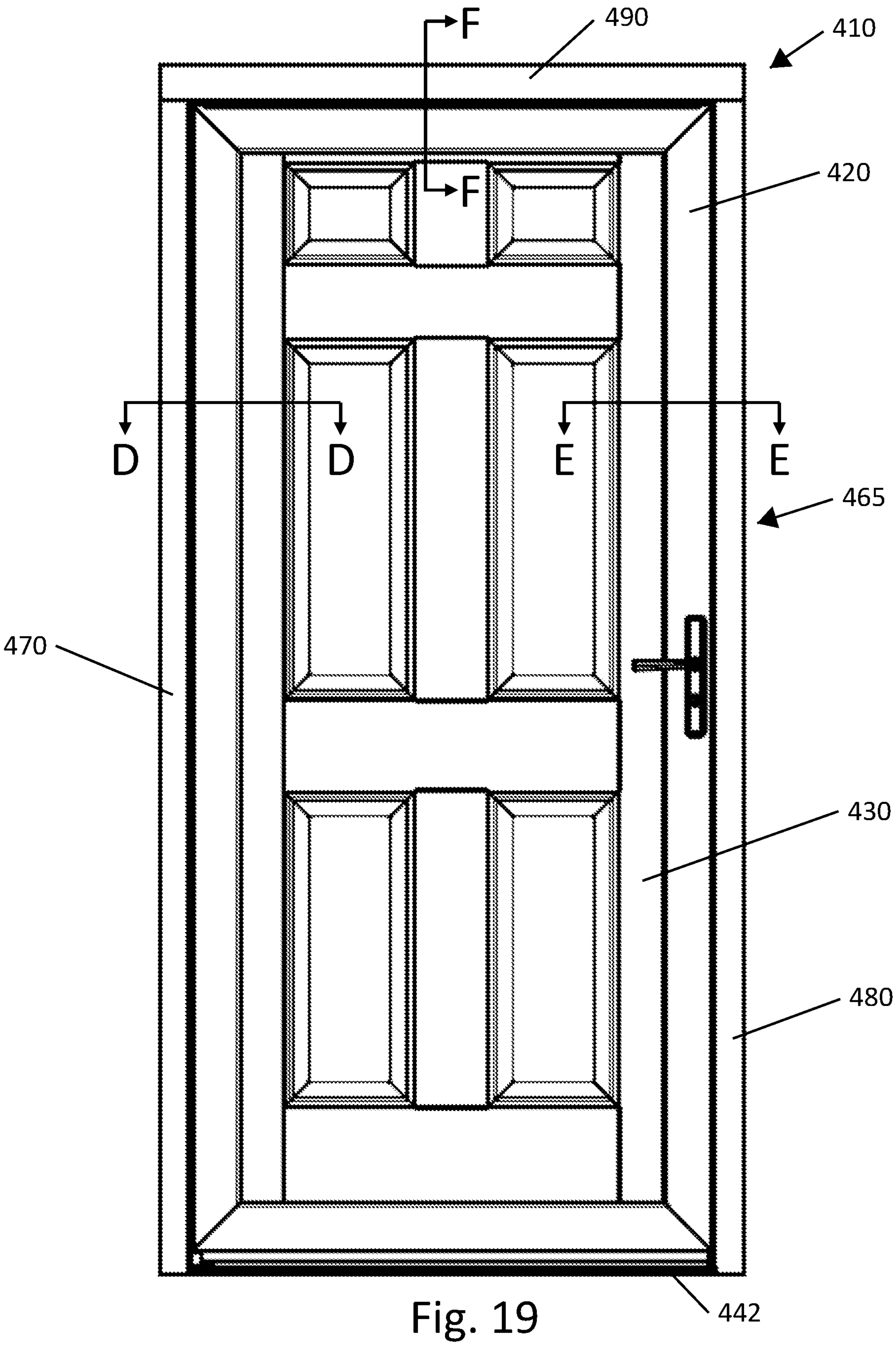
FIG. 19 is a front view of an embodiment of a primary/secondary door system as assembled with primary and secondary doors in a closed position.
Figure 20:
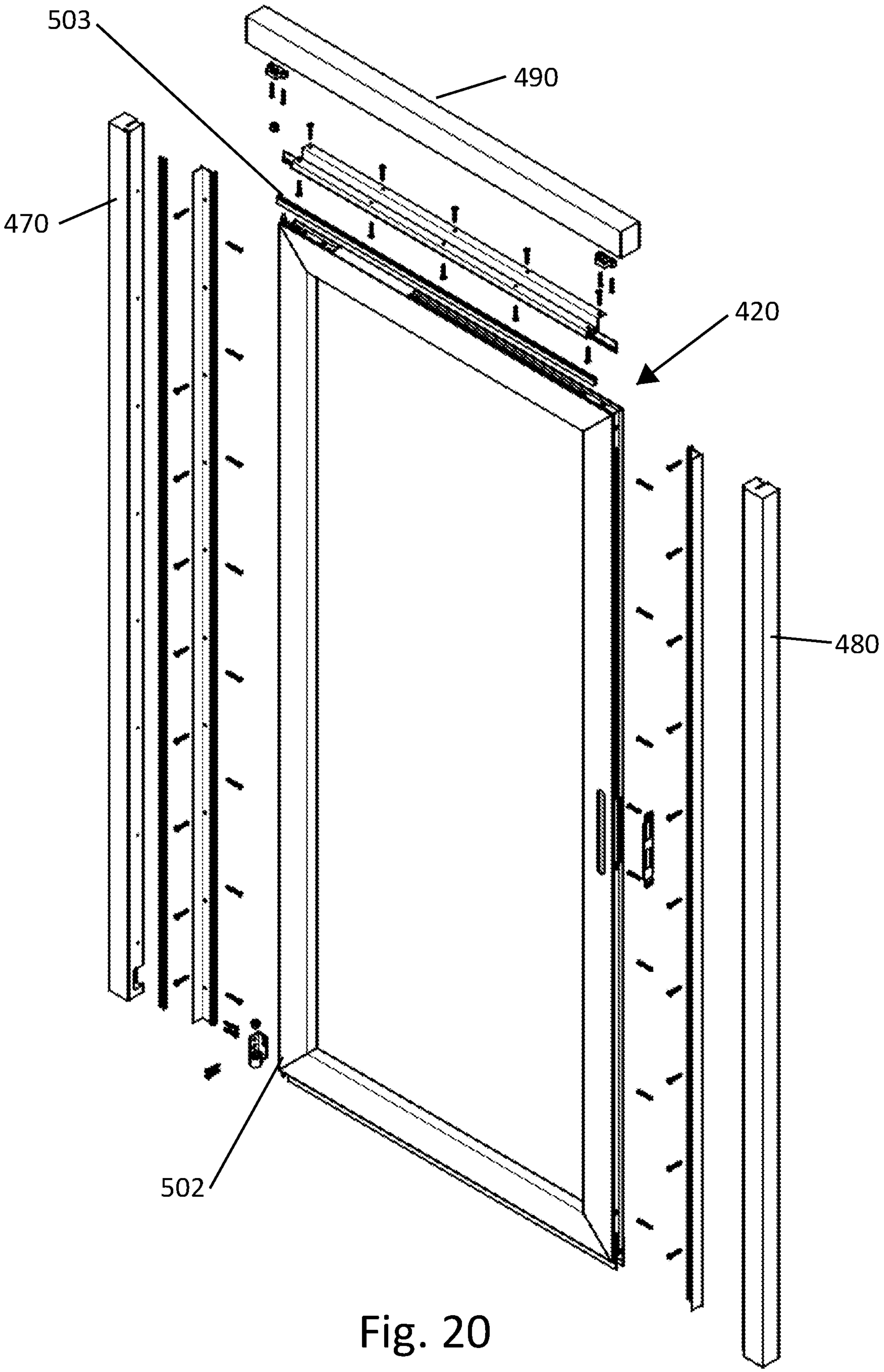
FIG. 20 is an exploded isometric view of the secondary door and primary door molding of FIGS. 18 and 19.

Referring to FIGS. 18 and 19, an embodiment of an assembled primary/secondary door system 410 is illustrated, which generally includes a secondary door 420 through which a primary door 430 is visible, and FIG. 20 is an exploded isometric view of the secondary door and primary door molding of FIGS. 18 and 19. In this embodiment, the secondary door 420 includes a glass panel; however, the secondary door 420 can include a number of different configurations, such as a screen door, a storm door, or security door, for example, and may include single or multiple transparent panels, opaque panels, screening panels, metal or mesh grilles, and the like.

Primary/secondary door system 410 further includes a hinge-side jamb 440, a latch-side jamb 450, a head 460, and a sill 442, which together comprise a primary door frame 435. Elements of the primary door frame 435 may be fastened together and/or to the building opening by any suitable mechanism, including mechanical fastening devices such as screws, rivets, nails, staples, dowels, customized mechanical connectors, and the like, or may additionally or alternatively use fastening mechanisms including adhesives, welding, or combinations thereof.

Primary/secondary door system 410 additionally includes a primary door molding 465 that is generally made up of a hinge-side molding 470, a latch-side molding 480, and a top molding 490. Elements of the primary door molding 465 may be fastened together by any suitable mechanism, including mechanical fastening devices such as screws, rivets, nails, staples, dowels, customized mechanical connectors, and the like, or may additionally or alternatively use fastening mechanisms including adhesives, welding, or combinations thereof. The primary door molding 465 may additionally utilize intermediate structures in combination with mechanisms such as inserts comprising perpendicular legs positioned at one or more corners. As shown, the primary door molding 465 may be attached to the primary door frame 435 by any suitable mechanism, including mechanical fastening devices such as screws, rivets, nails, staples, dowels, customized mechanical connectors, and the like, or may additionally or alternatively use adhesives, welding, or combinations thereof.

In some embodiments, a combination of the primary door molding 465 and the primary door frame 435 are configured as an integral construction. In other embodiments, hinge-side jamb 440 and hinge-side molding 470 are a unitary article (i.e., a single unified part such as would be made in a single molding, extrusion, or machining). Similarly, latch-side jamb 450 and latch-side molding 480 may be a unitary article, and/or head 460 and top molding 490 may be a unitary article. In embodiments, it is possible for only a single molding to be provided that cooperates with other structure(s) for mounting of a secondary door 420.

The illustrated embodiment of primary/secondary door system 410 illustrates a left-hinge out-swinging secondary door 420 and a left-hinge in-swinging primary door 430; however, it is understood that any combinations of left-hinge and right-hinge primary and secondary doors are also contemplated. Optionally, the position of the inner edge of at least one of hinge-side molding 470 and latch-side molding 480 are adjustable (e.g., by provision of a telescoping or extending sections that allow the inside edge of the molding to be adjusted before, during, or after attachment of the secondary door 420 to the primary door molding 465 in order to achieve a desired spacing and clearance between the primary door molding 465 and the secondary door 420).

Figure 21A:
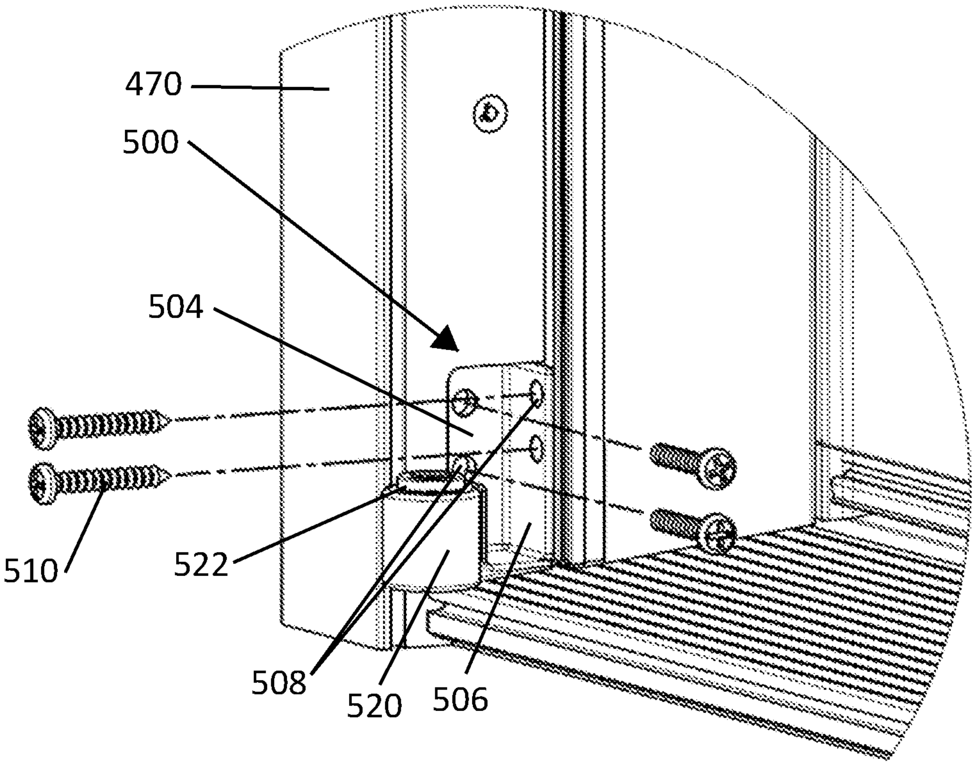
FIGS. 21*a* and 21*b* are perspective views of a portion of a lower corner at the hinge side of a primary door molding.
Figure 21B:
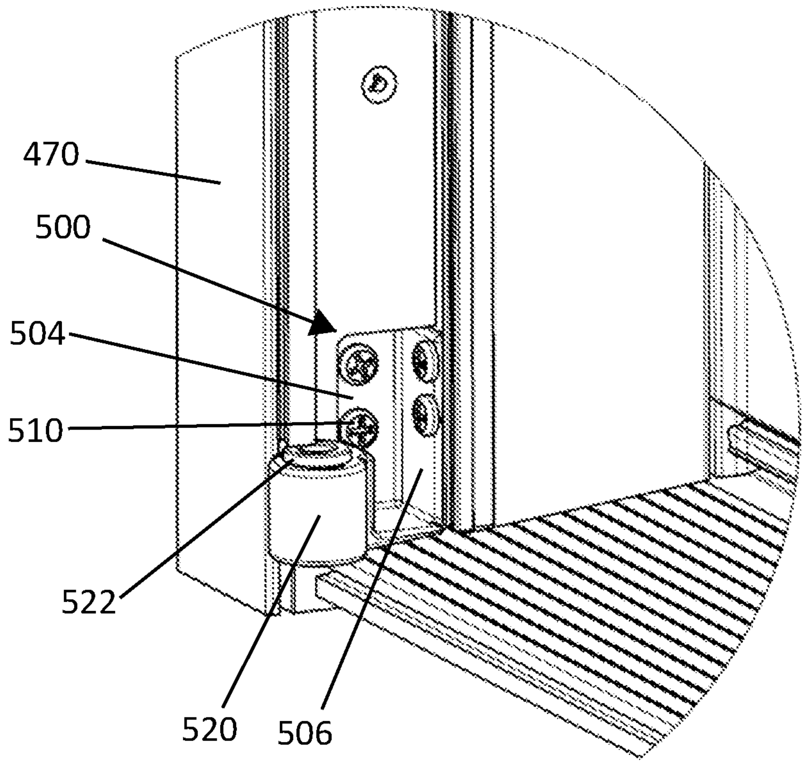

FIGS. 21*a* and 21*b* are enlarged views of a portion of the bottom or distal portion of the hinge-side molding 470 with an embodiment of a hinge plate or element 500 at a generally distal end of the hinge-side molding 470 and with fasteners 510 prior to fastening and after fastening, respectively. It is understood that while the hinge plate or element 500 is shown at the distal end of molding 470, the hinge plate or element 500 can instead be spaced vertically from the distal end of the hinge-side molding 470.

The hinge-side molding 470 includes a recessed area into which the hinge plate or element 500 is at least partially insertable. Hinge plate or element 500 includes a first mounting member 504 adjacent to a second mounting member 506, both of which extend in generally the same vertical direction as the hinge-side molding 470 in which the hinge plate or element 500 is positioned. First mounting member 504 is generally perpendicular to second mounting member 506 to provide for attachment of the hinge plate or element 500 to surfaces that are generally perpendicular to each other.

As shown, first and second mounting members 504, 506 each have two apertures 508 spaced vertically from each other. Although apertures 508 are shown as being positioned directly above each other, they may instead be offset or otherwise arranged relative to each other relative to each of the mounting members 504, 506. In other embodiments, each of the mounting members 504, 506 can include more or less than two apertures 508. Both of the mounting members 504, 506 can include the same number of apertures 508 as each other or can instead include different numbers of apertures 508. The hinge plate or element 500 is provided with multiple fasteners 510 to correspond with each of the apertures 508, which may include screws, nails, or other fastener configurations that are configured extend through the apertures 508 to attach the hinge plate or element 500 to the adjacent structure, such as rivets, staples, dowels, customized mechanical connectors, and the like, and may additionally or alternatively use adhesives, welding, or combinations thereof. In cases where adhesives, welding, or other similar fastening techniques are used, apertures 508 may not be provided through the mounting members 504, 506.

The hinge plate or element 500 further includes a pin-receiving member 520 with an aperture (not visible) that is configured to receive a bottom hinge pin 502 (visible in FIG. 20) extending from secondary door 420. The hinge plate or element 500 may further optionally include a bottom hinge bushing 522 within the aperture. In an embodiment, hinge pin 502 is engageable with the aperture (and optionally bottom hinge bushing 522) to form a bottom hinge which bears the greater part of the weight of and provides an axis for rotation of secondary door 420. The top portion of the secondary door 420 can include a top hinge pin 503 (visible in FIG. 20) rotatably engageable with either a rotatably engageable element of the top molding 490 or of a hinge plate extending from an upper area of a hinge-side molding 470. Such a rotatable engagement of the top portion of the secondary door 420 can have the same or a similar configuration to the hinge plate or element 500 or can have a different configuration.

With regard to the bottom hinge mechanism or rotatably engageable element, it is contemplated that such a feature is a part of the sill of a primary door frame rather than a hinge plate or element as described above. In such a configuration, the sill can include either an extending pin or an aperture (which can include a bushing) that is engageable with a corresponding aperture or pin of a secondary door for rotatable engagement between the components. The top of the secondary door will then be rotatably engageable with either a rotatably engageable element of the top molding or of a hinge plate extending from an upper area of a hinge-side molding.

Figure 22:
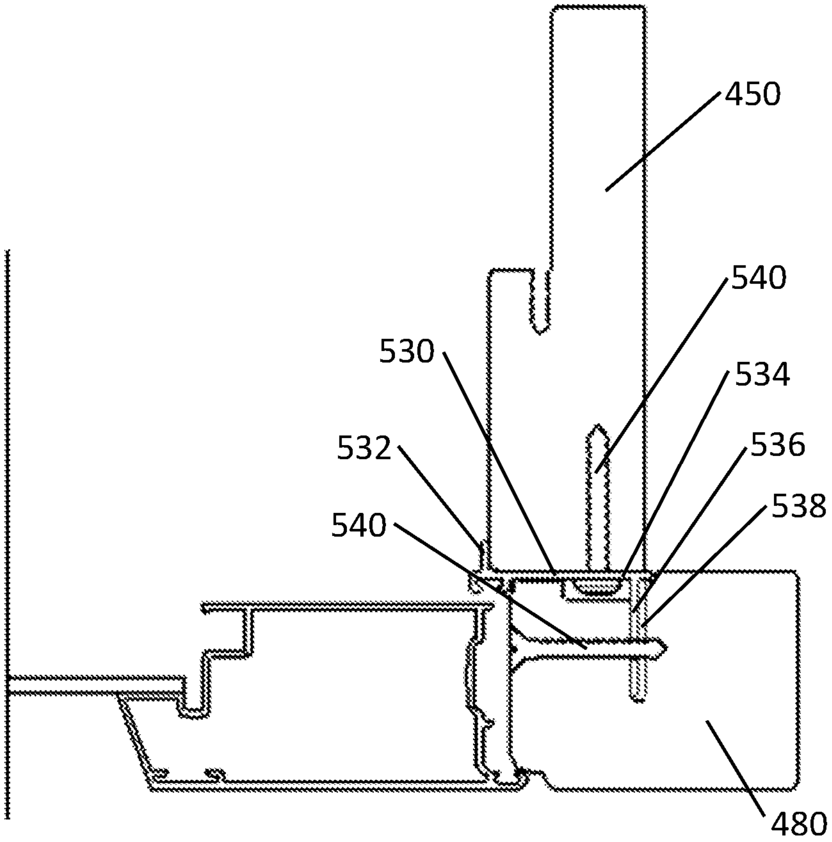
FIG. 22 is a cross-sectional view of a portion of the primary/secondary door system of FIG. 19 taken along section line E-E.
Figure 23:
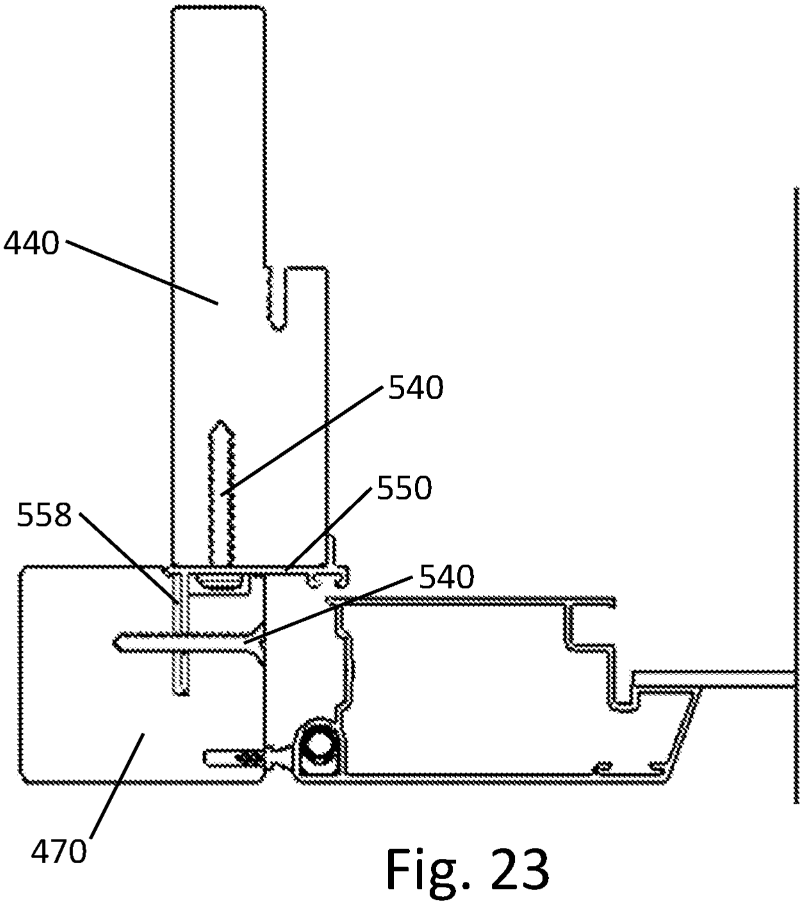
FIG. 23 is a cross-sectional view of a portion of the primary/secondary door system of FIG. 19 taken along section line D-D.

FIG. 22 illustrates a latch-side mounting adapter 530, which is provided as a stiffener and is used to locate the latch-side molding 480 in relation to latch-side jamb 450. Latch-side mounting adapter 530 includes a locator segment 532 which, when installed, extends in a direction generally orthogonal to the plane of the closed position of a secondary door and contacts an inner portion of latch-side jamb 450. Latch-side mounting adapter 530 further includes a channel segment 534 and a holding segment 536 which, when installed, reside in an angled latch-side mounting adapter channel 538. After installation, holding segment 536 of latch-side mounting adapter 530 maintains latch-side mounting adapter 530 in the latch-side mounting adapter channel 538 in a lateral direction. The preceding description applies similarly to a hinge-side mounting adapter 550, illustrated in FIG. 23, which can have the same general configuration as the latch-side mounting adapter 530 and a corresponding angled hinge-side mounting adapter channel 558. In addition, holding segment 536 locates latch-side molding 480 in relationship to latch-side jamb 450 and provides a structure to attach latch-side molding 480 to primary/secondary door system 410 while also strengthening and stiffening latch-side molding 480.

Latch-side and hinge-side mounting adapters 530, 550 may be identical if turned end-to-end (or "mirrored"), as illustrated, which can be useful for design and manufacturing considerations. Mounting adapters 530, 550 are configured for attachment to jambs 440, 450, and hinge-side molding 470 and latch-side molding 480 are configured for attachment to mounting adaptors 530, 550 by any suitable mechanism, including mechanical fastening devices such as the illustrated screws 540, and/or rivets, nails, staples, dowels, customized mechanical connectors, and the like, and may additionally or alternatively use adhesives, welding, or combinations thereof. Mounting of the primary door molding on the primary door frame by the mechanism of mounting adapters 530, 550 traveling in mounting adapter channels 538,558 permits a limited amount of vertical and lateral movement of the primary door molding relative to the primary door frame 435. Other elements of FIGS. 22 and 23 can include similar features and functionality as described above with regard to FIGS. 18-20.

Primary/secondary door system 410 includes the primary door frame 435 (which includes hinge-side and latch-side jambs 440, 450, head 460, and sill 442) and the primary door molding 465 (which includes hinge-side and latch-side moldings 470, 480 and top molding 490) assembled together. Optionally, these components form an integral construction. The primary/secondary door system 410 additionally includes a primary door 430 rotatably attached by hinges to the primary door frame 435. The primary/secondary door system 410 (minus secondary door 420) can be installed in a generally customary manner for a primary door (e.g., in a door opening in a commercial or residential building). Optionally, the primary door molding 465 can be anchored or attached to the building surface. The primary/secondary door system 410 is then in a configuration for optional mounting of a secondary door 420 on the primary door molding 465.

Figure 24A:
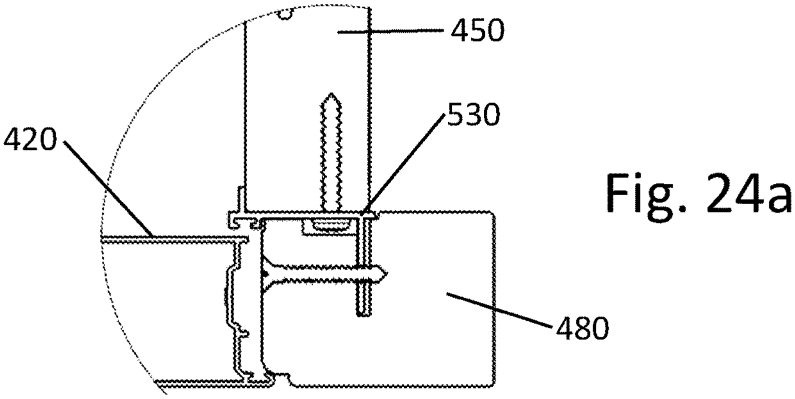
FIGS. 24*a* and 24*b* are alternative cross-sectional views of a portion of the primary/secondary door system of FIG. 19 taken along section line E-E.
Figure 24B:
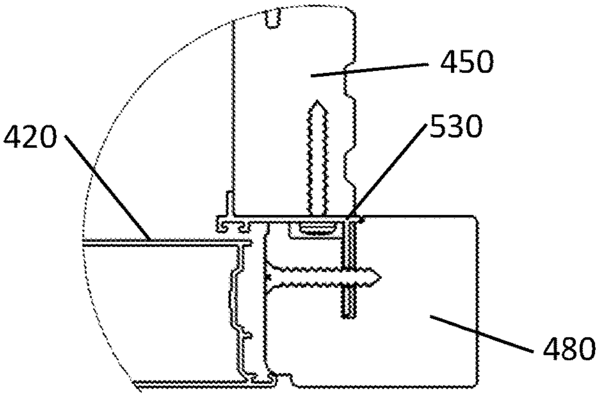

FIGS. 24*a* and 24*b* are alternative cross-sectional views of a portion of the primary/secondary door system of FIG. 19 taken along section line E-E, wherein the door system of FIG. 24*a* is used to fill a wider building opening than the door system of FIG. 24*b* while using a secondary door having the same width. In particular, FIG. 24*a* includes a latch-side molding 480 that is wider than the latch-side molding 480 of FIG. 24*b*. As shown, the same latch-side mounting adapter 530 is used in both embodiments, such that the latch-side moldings 480 are differently positioned relative to the adapter 530 (i.e., shifted in a horizontal direction) to provide for proper positioning of the primary/secondary door systems within the provided building openings and to provide the proper lateral extension of latch-side molding 480 beyond the outside edge of latch-side jamb 450. The preceding description applies similarly to hinge-side molding 470, hinge-side mounting adapter 550, and hinge-side jamb 440.

Figure 25A:
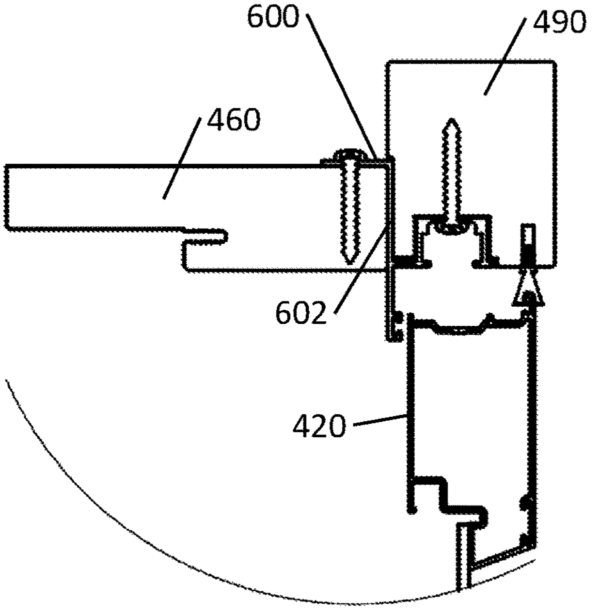
FIGS. 25*a* and 25*b* are alternative cross-sectional views of a portion of the primary/secondary door system of FIG. 19 taken along section line F-F.
Figure 25B:
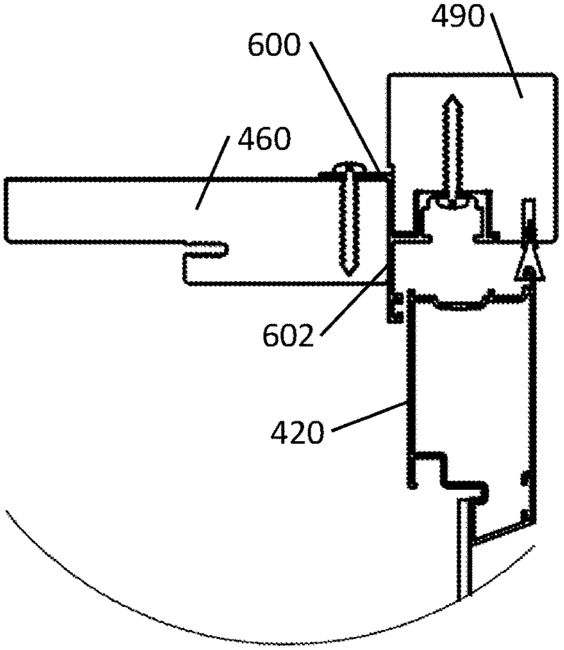

Similarly, FIGS. 25*a* and 25*b* are alternative cross-sectional views of a portion of the primary/secondary door system of FIG. 19 taken along section line F-F, wherein the door system of FIG. 25*a* is used to fill a taller building opening than the door system of FIG. 25*b* while using a secondary door having the same height. In particular, FIG. 25*a* includes a top molding 490 that is taller than the top molding 490 of FIG. 25*b*. As shown, a head support piece 600 is engageable with and secured to head 460 of a primary door frame and top molding 490 of a primary door molding of the embodiments of both FIGS. 25*a* and 25*b*. The illustrated head support pieces 600 are each configured with a vertically extending member 602 that is longer for the embodiment of FIG. 25*a* than that of FIG. 25*b*. In this way, the distance between the illustrated top surface of the head 460 and the illustrated top surface of the top molding 490 is the same in both embodiments of FIGS. 25*a* and 25*b*, and for other top moldings having different heights than those illustrated.

Figure 26:
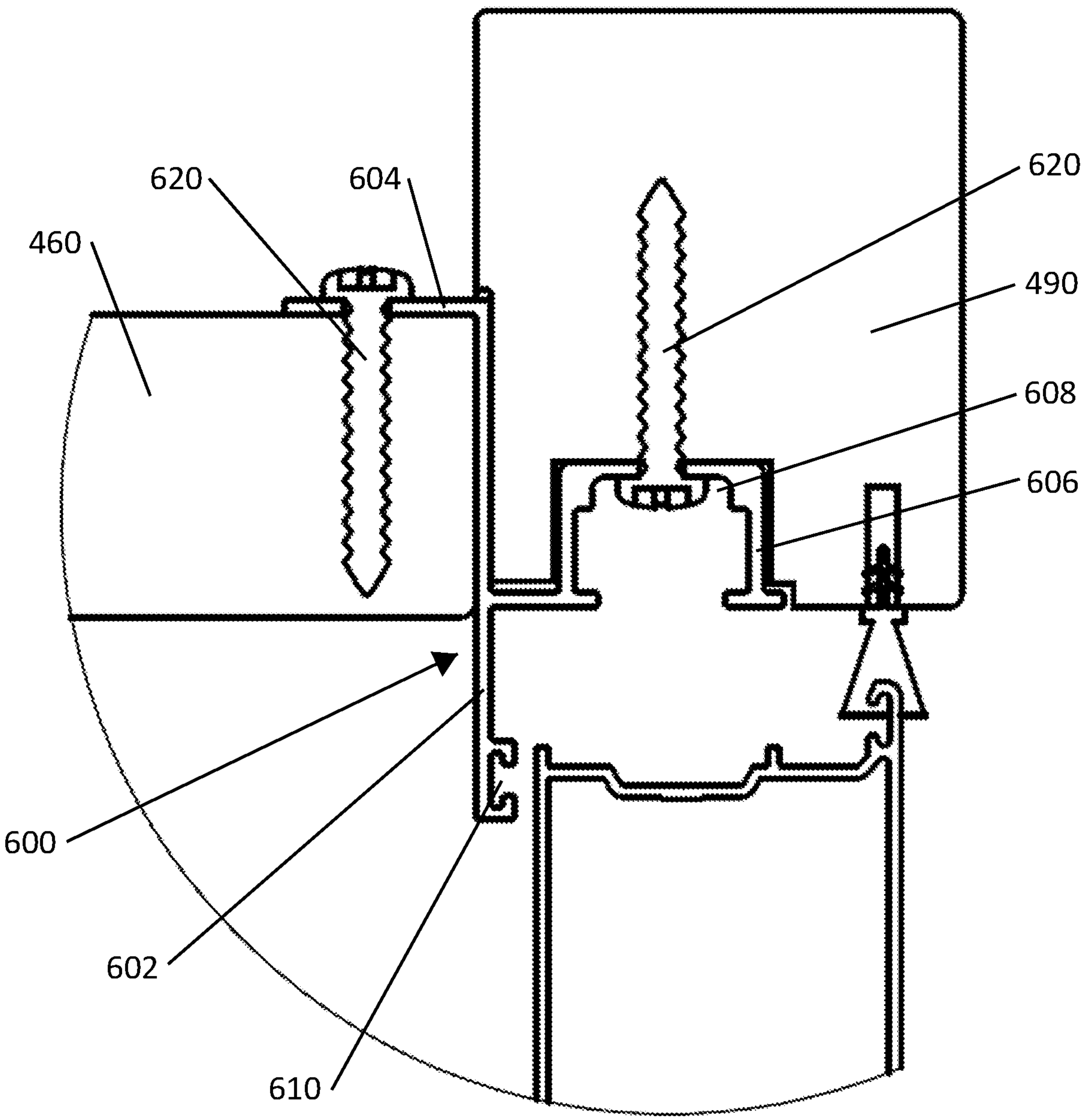
FIG. 26 is a cross-sectional view of a portion of the primary/secondary door system of FIG. 19 taken along section line F-F.

FIG. 26 is a cross-sectional view of a portion of the primary/secondary door system of FIG. 19 taken along section line F-F, which includes head support piece 600 that attaches the top molding 490 to the head 460 of a primary door frame while also strengthening and stiffening top molding 490. As shown, head support piece 600 includes extending member 602 (which extends vertically, in this illustration) positioned between ends of the top molding 490 and the head 460, head member 604 adjacent to one end portion of extending member 602, and a channel member 606 adjacent to a central portion of extending member 602 on the opposite side from the head member 604. Head member 604 is positioned on top of head 460 and is secured to head 460 via a fastener 620 (e.g., a screw), while an inner area of channel member 606 is similarly secured to top molding 490 by a fastener 620 (e.g., a screw).

Channel member 606 of head support piece 600 serves as a track for a portion of a closer arm that can be positioned therein and slide along its length. As such, channel member 606 includes an optional recessed portion 608 in which the head of fastener 620 can be positioned or recessed relative to the rest of the opening within channel member 606 so that there is no interference or contact between the fastener 620 and the portion of a closer arm positioned in the channel member 606. However, the head support piece 600 can be attached to adjacent structures using other mechanisms that do not have a protruding screw head, including mechanical fastening devices such as screws, rivets, nails, staples, dowels, customized mechanical connectors, and the like, or may additionally or alternatively use adhesives, welding, or combinations thereof, wherein at least some of these attachment mechanisms would not require a recessed portion within the channel member 606.

Head support piece 600 further includes at least one weatherstrip channel 610 extending from member 602 for sealing a storm door. Weatherstrip channel 610 is illustrated at a distal end of member 602 on the same side as the channel member 606; however, weatherstrip channel 610 can instead be located in a different position on the head support piece 600.

Figure 27A:
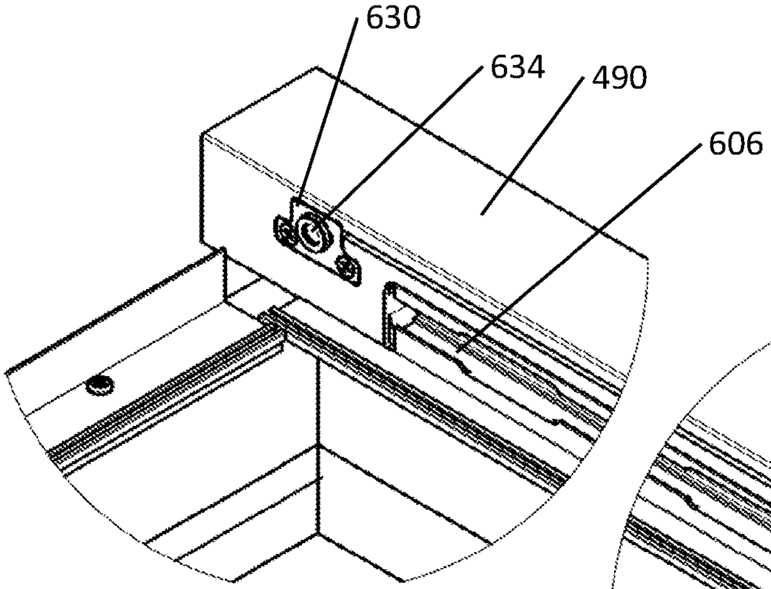
FIGS. 27*a* and 27*b* are perspective views of the bottom side of a top molding of a primary/secondary door system at a top hinge-side corner and a latch-side corner, respectively.
Figure 27B:
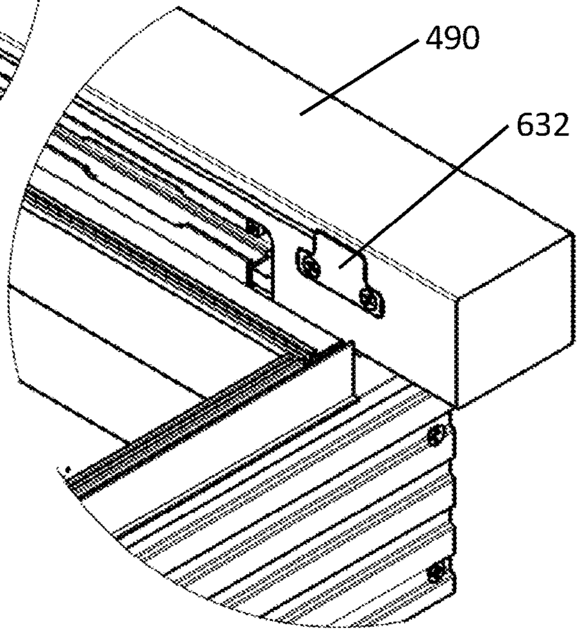

FIGS. 27*a* and 27*b* are perspective views of the bottom side of a top molding 490 of a primary/secondary door system at a top hinge-side corner and a latch-side corner, respectively. Top molding 490 includes recessed channel member 606 described above relative to FIG. 26, for example. Top molding 490 further includes pockets adjacent to each of its ends that can receive either a pivot member 630 (FIG. 27*a*) or a plug member 632 (FIG. 27*b*), wherein the pivot member 630 and plug member 632 share similar peripheral geometries. Pivot member 630 may further optionally include a top hinge bushing 634 within an aperture (not illustrated) into which a pin of a secondary door can be inserted to provide the top portion of a hinge. As shown, the pivot member 630 is positioned on the left side of the top molding 490 to provide for left-hand hinging, while the plug member 632 is positioned on the right side of the top molding 490 to cover the pocket opening. However, if it is desired to instead provide for right-hand hinging, the pivot member 630 can be positioned on the right side of the top molding 490, while the plug member 632 would then be positioned on the left side of the top molding 490. Such a plug member 632 is optional, although it can be desirable for aesthetic purposes. In addition, it is possible for the pockets on both ends of the top molding 490 to include a pivot member 630, even though only one of them will be engaged with a pin of a secondary door. Such a configuration and arrangement of the top molding 490, pivot member 630, and plug member 632 offer the ability to provide for either left-hand or right-hand hinging through universal components, thereby avoiding the cost and complexity of unique components for left-hand and right-hand hinging.

Figure 28:
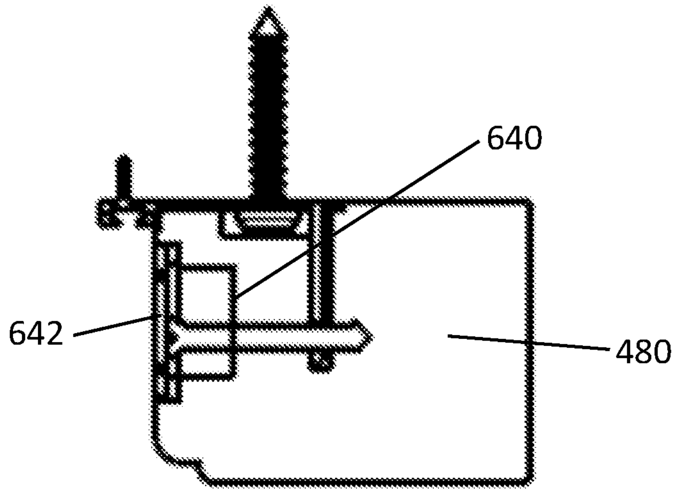
FIG. 28 is a cross-sectional view of a portion of the primary/secondary door system of FIG. 19 taken along section line E-E.
Figure 29:
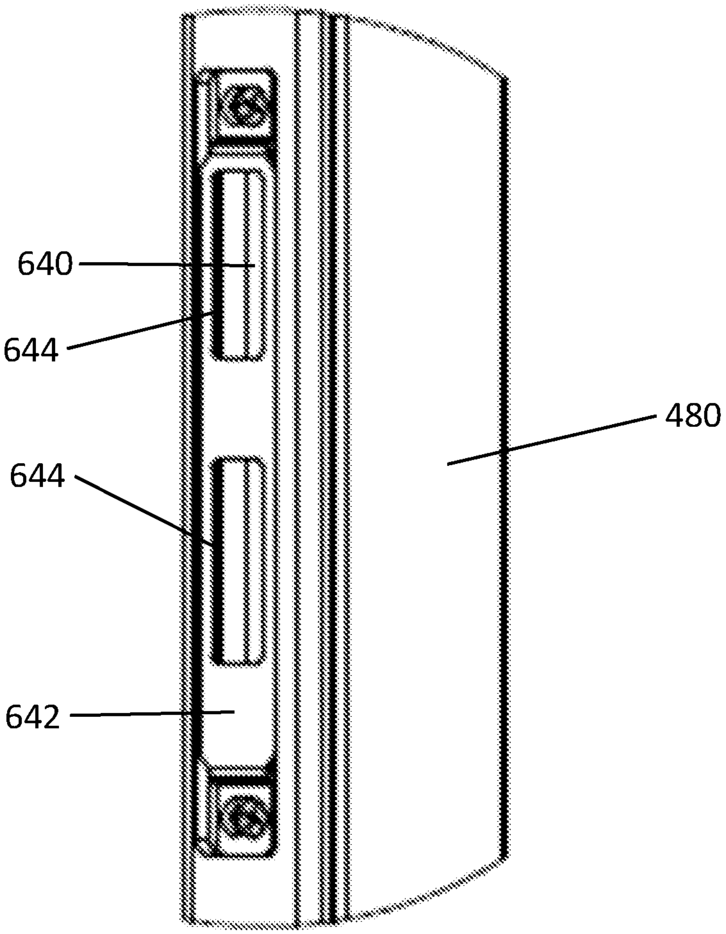
FIG. 29 is an isometric view of a latch plate area of the latch-side molding of the primary/secondary door system of FIG. 19.

FIGS. 28 and 29 provide a cross-sectional view taken along section line E-E of FIG. 19 and an isometric view of a latch plate area of the latch-side molding 480, respectively. A channel 640 extends along a portion of the height of the latch-side molding 480, and a strike plate 642 is secured within the channel 640 using screws or other fastening means or mechanisms. The strike plate can include two openings 644 spaced vertically from each other to receive a latchbolt and a deadbolt extending from a door, for example, or can include more or less than two openings 644 to receive a different number of latch and lock extensions.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A door system comprising:

a door molding attachable to a door frame, the door molding comprising:
- a first vertical molding member; and
- a hinge element extending from the first vertical molding member, the hinge element comprising:
  - a first mounting member mountable to a bottom end of the first vertical molding member;
  - a second mounting member extending at an angle from a vertical edge of the first mounting member and configured to be mounted to a bottom end of the door frame;
  - a plate portion extending horizontally from a bottom end of the first mounting member; and
  - a pin-receiving member extending upward from the plate portion and positioned horizontally inward of the first vertical molding member when the mounting member is mounted to the bottom end of the door molding, the pin-receiving member defining a vertically extending hole for receiving a lower hinge pin on a door panel.

2. The door system of claim 1, wherein the first mounting member comprises a first face that is perpendicularly arranged relative to a second face of the second mounting member.

3. The door system of claim 1, wherein the first vertical molding member comprises a recess into which the hinge element is at least partially insertable.

4. The door system of claim 1, further comprising at least one fastener insertable through at least one mounting aperture of the mounting member to mount the mounting member to the bottom end of the door molding.

5. The door system of claim 1, wherein the pin-receiving member comprises a bushing.

6. The door system of claim 1, wherein the first mounting member is integrally formed with the second mounting member.

7. The door system of claim 1, wherein the mounting member is integrally formed with the pin receiving member.

8. The door system of claim 1, further comprising a door frame including a first vertical frame member to which the first vertical molding member is attachable.

9. The door system of claim 1, wherein the door molding further comprises a top molding extending horizontally from a top end of the vertical molding member opposite the bottom end.

10. The door system of claim 9, wherein the pin-receiving member is a first pin receiving member, and wherein one of the first vertical molding member and the top molding comprises a second pin-receiving member defining a vertically extending hole for receiving an upper hinge pin of a door panel.

11. The door system of claim 10, wherein the second pin-receiving member comprises a bushing.

12. The door system of claim 10, further comprising a door panel including a lower hinge pin receivable into the vertically extending hole of the first pin-receiving member, and an upper hinge pin receivable into the vertically extending hole of the second pin receiving member.

13. The door system of claim 12, wherein at least one of the upper and lower hinge pins comprises a retractable pin biased to an extended position for insertion into the vertically extending hole of the corresponding one of the first and second pin-receiving members.

14. The door system of claim 12, wherein each of the upper and lower hinge pins comprises a retractable pin biased to an extended position for insertion into the vertically extending hole of the corresponding one of the first and second pin-receiving members.

15. The door system of claim 1, further comprising a door panel including a lower hinge pin receivable into the vertically extending hole of the first pin-receiving member.

16. The door system of claim 1, wherein the lower hinge pin comprises a retractable pin biased to an extended position for insertion into the vertically extending hole of the pin-receiving member.

* * * * *